US011769441B2

(12) United States Patent
Takagi et al.

(10) Patent No.: US 11,769,441 B2
(45) Date of Patent: Sep. 26, 2023

(54) DISPLAY MODULE AND DISPLAY DEVICE

(71) Applicant: SEIKO EPSON CORPORATION, Tokyo (JP)

(72) Inventors: Masayuki Takagi, Azumino (JP); Mitsutaka Ide, Shiojiri (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 11 days.

(21) Appl. No.: 17/537,348

(22) Filed: Nov. 29, 2021

(65) Prior Publication Data
US 2022/0172667 A1 Jun. 2, 2022

(30) Foreign Application Priority Data
Nov. 30, 2020 (JP) .................................. 2020-198138

(51) Int. Cl.
*G09G 3/20* (2006.01)
(52) U.S. Cl.
CPC ... *G09G 3/2092* (2013.01); *G09G 2320/0242* (2013.01); *G09G 2340/0464* (2013.01)
(58) Field of Classification Search
None
See application file for complete search history.

(56) References Cited

U.S. PATENT DOCUMENTS

| 2010/0091027 A1 | 4/2010 | Oyama et al. |
| 2019/0033567 A1* | 1/2019 | Kajiyama .......... G02B 17/0896 |
| 2020/0142194 A1 | 5/2020 | Ide et al. |

FOREIGN PATENT DOCUMENTS

| CN | 111142249 | 5/2020 |
| JP | 2010096864 | 4/2010 |
| JP | 2018049039 | 3/2018 |
| JP | 2019045630 | 3/2019 |

* cited by examiner

Primary Examiner — Yingchun He
(74) *Attorney, Agent, or Firm* — JCIPRNET

(57) ABSTRACT

A display module includes a display element, a light-guiding optical device, and a control unit configured to perform distortion correction including correction of a chromatic aberration of magnification. The light-guiding optical device is constituted of an optical system having non-axisymmetry in an up-and-down direction with respect to the imaging light entering the light-guiding optical device, and includes a first optical member having positive refractivity, a second optical member having positive refractivity, and a first reflection surface configured to reflect the imaging light toward a pupil position. The refractivity of the first optical member is greater than the refractivity of the second optical member. An abbe number of a constituent material of the first optical member is greater than an abbe number of a constituent material of the second optical member. The control unit performs distortion correction by a different distortion correction amount for each color light.

9 Claims, 12 Drawing Sheets

DISPLAY MODULE AND DISPLAY DEVICE

The present application is based on, and claims priority from JP Application Serial Number 2020-198138, filed Nov. 30, 2020, the disclosure of which is hereby incorporated by reference herein in its entirety.

BACKGROUND

1. Technical Field

The present disclosure relates to a display module and a display device.

2. Related Art

Hitherto, there has been known a virtual image display device that enables observation of a virtual image by allowing an optical element such as a projection lens to guide, to a pupil of an observer, imaging light emitted from a display element. JP-A-2019-45630 discloses an image display device including an image display element, an eyepiece optical system, and an image processing means. The eyepiece optical system includes an anamorphic optical system in which focal lengths in two cross sections vertical to each other are different from each other, and guides light from the image display element to an eye of an observer. The image processing means generates an original image by subjecting an input image to correction of an optical aberration caused in the eyepiece optical system and to conversion of an aspect ratio of the image.

JP-A-2019-45630 discloses that the image display device performs distortion correction or correction of a chromatic aberration of magnification for an image having an optical aberration caused in the axisymmetric eyepiece optical system. However, JP-A-2019-45630 neither disclose nor indicate a method of correcting an optical aberration caused in a non-axisymmetric light-guiding optical system.

SUMMARY

In order to solve the above-mentioned problem, a display module according to one aspect of the present disclosure includes a display element configured to emit imaging light including first color light and second color light different from the first color light, a light-guiding optical device configured to guide the imaging light emitted from the display element, and a control unit configured to perform distortion correction including correction of a chromatic aberration of magnification for an image displayed on the display element, wherein the light-guiding optical device is constituted of an optical system having non-axisymmetry in an up-and-down direction with respect to the imaging light entering the light-guiding optical device, the light-guiding optical device includes a first optical member having positive refractivity, a second optical member having positive refractivity, and a first reflection surface configured to reflect the imaging light toward a pupil position, the imaging light being emitted from the second optical member, the refractivity of the first optical member is greater than the refractivity of the second optical member, an abbe number of a constituent material of the first optical member is greater than an abbe number of a constituent material of the second optical member, and the control unit performs distortion correction by a different distortion correction amount for each of the first color light and the second color light.

A display module according to another aspect of the present disclosure includes a display element configured to emit imaging light including first color light and second color light different from the first color light, a light-guiding optical device configured to guide the imaging light emitted from the display element, and a control unit configured to perform distortion correction including correction of a chromatic aberration of magnification for an image displayed on the display element, wherein the light-guiding optical device is constituted of an optical system having non-axisymmetry in an up-and-down direction with respect to the imaging light entering the light-guiding optical device, the light-guiding optical device includes a first optical member having positive refractivity, a second optical member having positive refractivity, and a first reflection surface configured to reflect the imaging light toward a pupil position, the imaging light being emitted from the second optical member, the refractivity of the first optical member is greater than the refractivity of the second optical member, an abbe number of a constituent material of the first optical member is greater than an abbe number of a constituent material of the second optical member, and the control unit performs distortion correction by the same distortion amount for the first color light and the second color light, and displays images corresponding to the first color light and the second color light subjected to the distortion correction at display positions shifted according to color light.

A display device according to one aspect of the present disclosure includes the display module according to one aspect of the present disclosure.

DESCRIPTION OF EXEMPLARY EMBODIMENTS

First Exemplary Embodiment

With reference to FIG. 1 to FIG. 10, a first exemplary embodiment of the present disclosure is described below.

Figure 1:
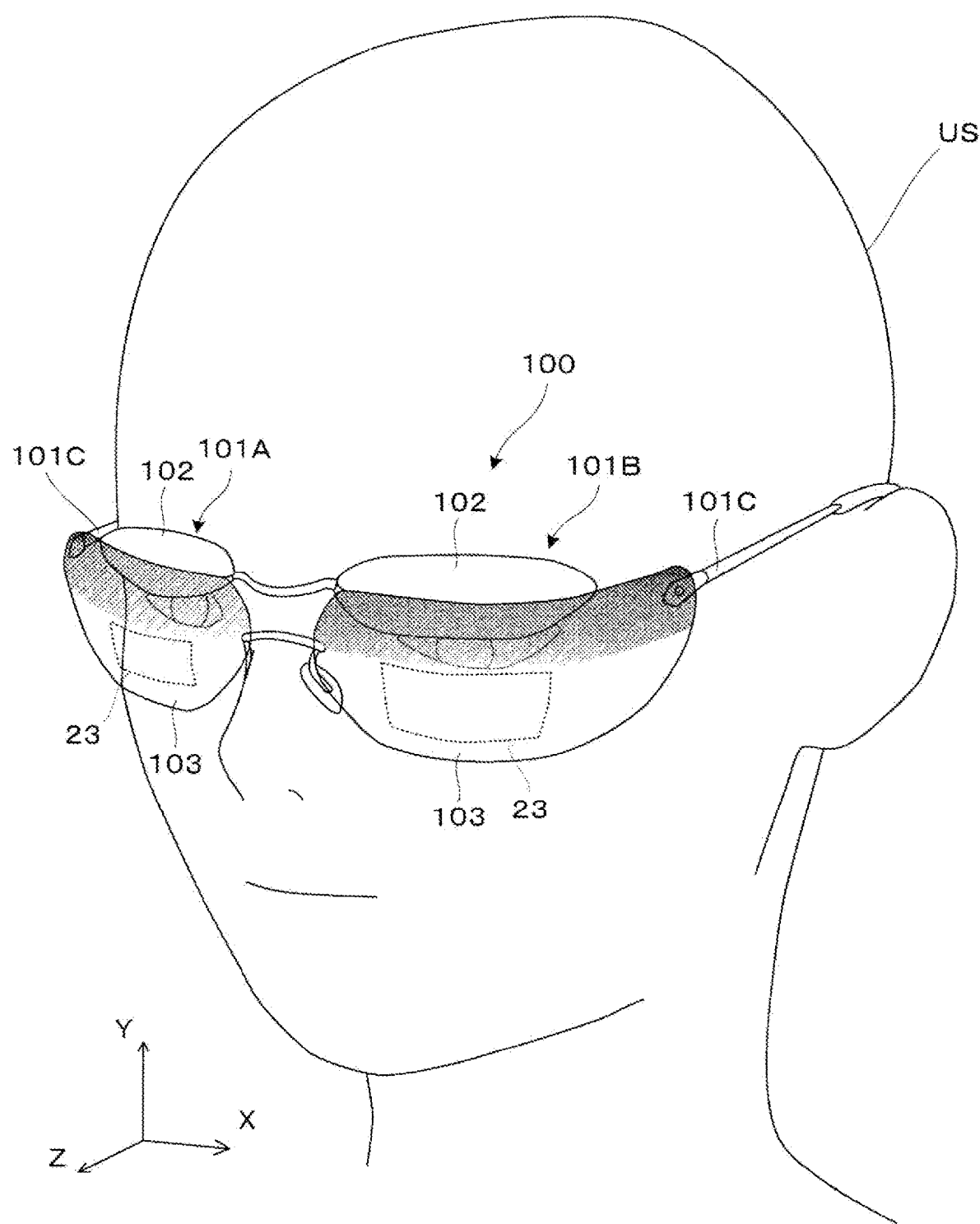
FIG. 1 is an external perspective view illustrating a state in which a virtual image display device of a first exemplary embodiment is worn.
Figure 2:
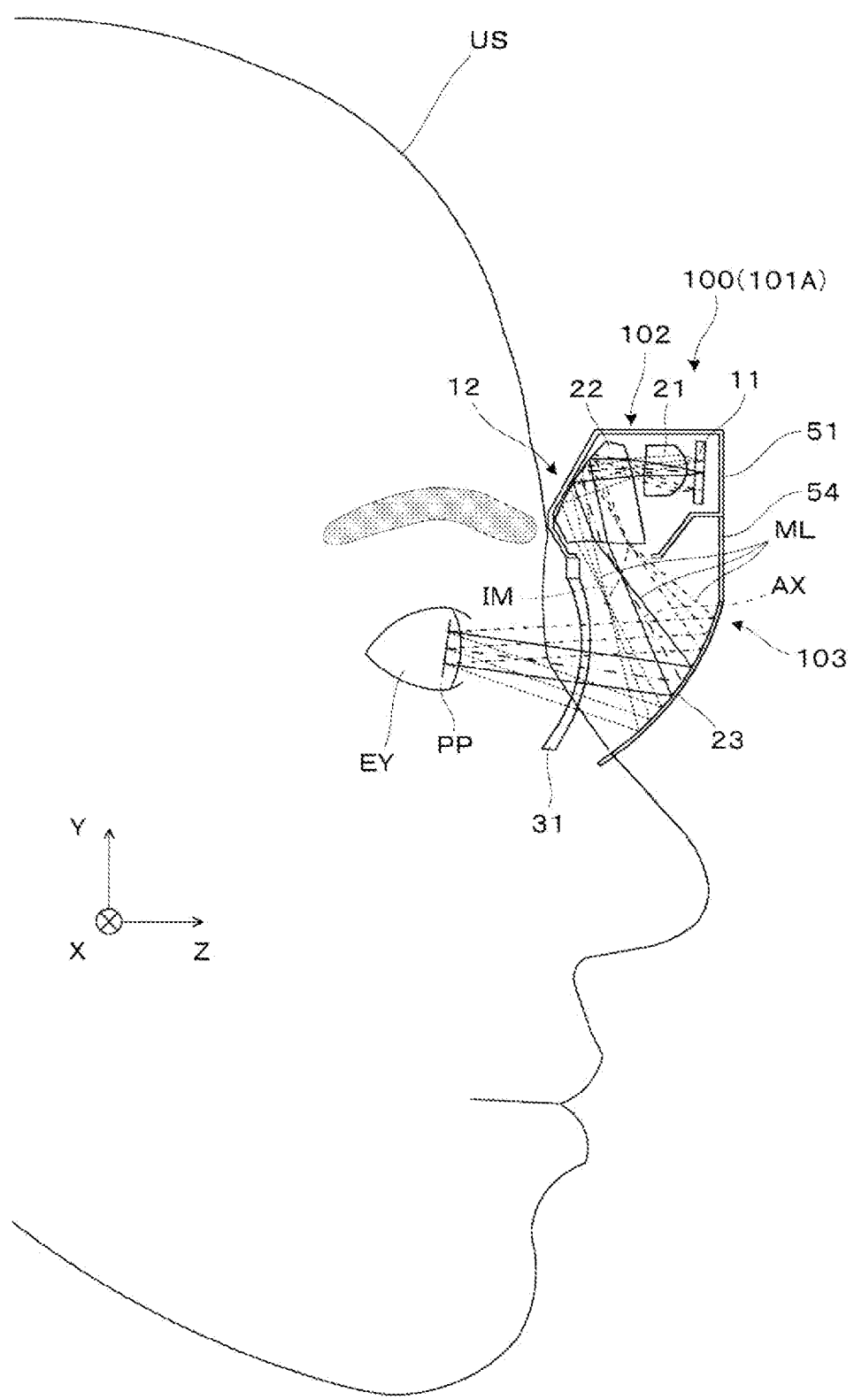
FIG. 2 is a longitudinal cross-sectional view of the virtual image display device.
Figure 3:
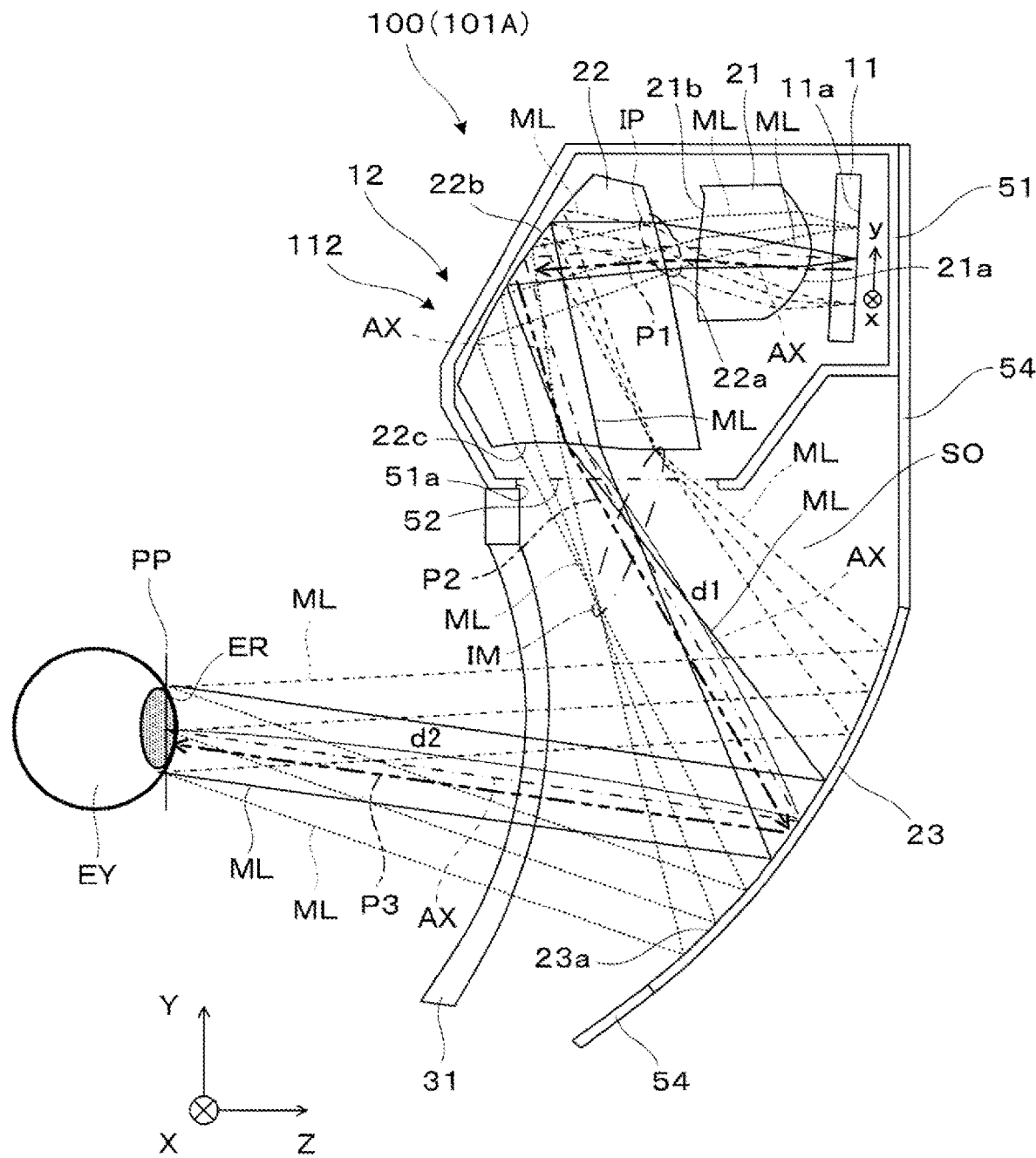
FIG. 3 is a longitudinal cross-sectional view illustrating an inner structure of the virtual image display device.

FIG. 1 is an external perspective view illustrating a state in which a virtual image display device of the present exemplary embodiment is worn. FIG. 2 is a longitudinal cross-sectional view of the virtual image display device. FIG. 3 is a longitudinal cross-sectional view illustrating an inner structure of the virtual image display device.

Note that, in the drawings, the dimensions of some components may be scaled differently for ease of understanding for the components.

As illustrated in FIG. 1 and FIG. 2, a virtual image display device 100 of the present exemplary embodiment is a head-mounted display (HMD), and causes an observer or a user US to recognize video as a virtual image.

The virtual image display device 100 of the present exemplary embodiment corresponds to the display device in the scope of the claims.

In FIG. 1 and FIG. 2, X, Y, and Z define an orthogonal coordinate system. A +X direction and a −X direction correspond to a direction in which the right eye and the left eye of the user US wearing the virtual image display device 100 are aligned, correspond to a direction in which display modules, which have the same constituting members and correspond to the right eye and the left eye, are aligned, and are defined as a right-and-left direction in the present specification. The +X direction corresponds to a rightward direction as viewed from the user US, and the −X direction corresponds to a leftward direction as viewed from the user US. A +Y direction and a −Y direction correspond to a direction orthogonal to the right-and-left direction in which the right eye and the left eye of the user US are aligned, correspond to a direction in which a display element 11 and a projection lens 21, and a see-through mirror 23 described later are aligned, and are defined as an up-and-down direction in the present specification. The +Y direction corresponds to an upward direction, and the −Y direction corresponds to a downward direction. A +Z direction and a −Z direction are orthogonal to the +X direction and the −X direction, and the +Y direction and the −Y direction, respectively, correspond to a front-and-back direction as viewed from the user US, and correspond to a direction in which constituting members from the display element 11 to a prism 22 described later are aligned. The +Z direction corresponds to a frontward direction, and the +Z direction corresponds to a backward direction.

The virtual image display device 100 includes a first display module 101A, a second display module 101B, and supporting members 101C each having a temple-like shape. The first display module 101A forms a first virtual image corresponding to the right eye. The second display module 101B forms a second virtual image corresponding to the left eye. The supporting members 101C support the first display module 101A and the second display module 101B.

The first display module 101A includes an optical unit 102 that is arranged as an upper part and an external member 103 that has an eye-glass lens shape covering the entirety. Similarly to the first display module 101A, the second display module 101B includes the optical unit 102 that is arranged as an upper part and the external member 103 that has an eye-glass lens shape covering the entirety. The supporting members 101C supports the first display module 101A and the second display module 101B at the upper ends of the external members 103 via members (not illustrated) arranged behind the external members 103.

The second display module 101B has a structure identical to that of the first display module 101A. Thus, only the first display module 101A is described below, and description of the second display module 101B is omitted. Further, in the following description, the first display module 101A is simply referred to as a display module 101A.

Figure 9:
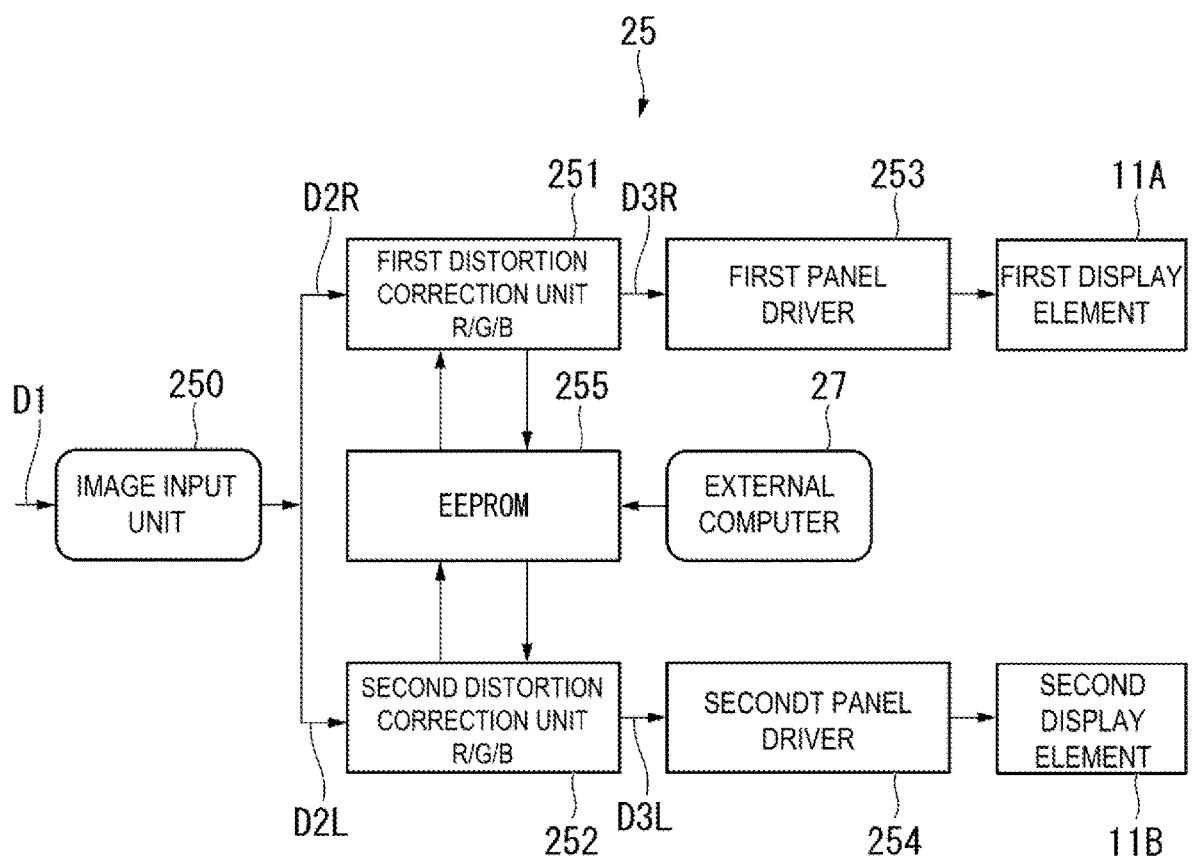
FIG. 9 is a block diagram illustrating a configuration of a control unit.

As illustrated in FIG. 2 and FIG. 3, the display module 101A includes the display element 11, a light-guiding optical device 12, and a control unit 25 (see FIG. 9). The light-guiding optical device 12 guides imaging light ML emitted from the display element 11. The display element 11 emits imaging light including color light components of different colors. Specifically, the color light components of different colors include blue light, green light, and red light. The light-guiding optical device 12 includes the projection lens 21, the prism 22, and the see-through mirror 23. The light-guiding optical device 12 guides imaging light emitted from the display element 11. The control unit 25 performs distortion correction including correction of a chromatic aberration of magnification for an image displayed on the display element 11.

The display module 101A of the present exemplary embodiment corresponds to the display module in the scope of the claims. The display element 11 of the present exemplary embodiment corresponds to the display element in the scope of the claims. The light-guiding optical device 12 of the present exemplary embodiment corresponds to the light-guiding optical device in the scope of the claims. The see-through mirror 23 of the present exemplary embodiment corresponds to the first reflection surface in the scope of the claims. With regard to any two color light beams among the blue light, the green light, and the red light of the present exemplary embodiment, one color light beam corresponds to the first color light in the scope of the claims, and the other color light beam corresponds to the second color light in the scope of the claims.

For clear description of a basic configuration of the display module 101A and basic behavior of light, an example in which the light-guiding optical device 12 includes one projection lens 21 is given below. However, in the present exemplary embodiment, the light-guiding optical device 12 including a plurality of lenses and a prism is used so as to reduce an axial chromatic aberration caused by the light-guiding optical device 12. In a method of reducing an axial chromatic aberration, the light-guiding optical device 12 including a plurality of lenses and a prism is used, and refractivity and an abbe number of each of the plurality of lenses and the prism is set as appropriate. This method is described later in detail.

The display element 11 is constituted of, for example, a display device of a self-light emission type exemplified by an organic electroluminescence (EL) element, an inorganic EL element, a light emitting diode (LED) array, an organic LED, a laser array, a quantum dot light emission type element, and the like. The display element 11 forms a still image or a moving image in color on a two-dimensional display surface 11a. The display element 11 performs a display operation under control of the control unit 25.

When an organic EL display or a display device is used as the display element 11, the display element 11 is configured to include an organic EL control unit. When a quantum dot light emission type display is used as the display element 11, the display element 11 is configured to emit light colored with green or red by irradiating a quantum dot film with light of a blue light emitting diode (LED). The display element 11 is not limited to a display element of a self-light emission type. The display element 11 may be constituted of a liquid crystal display (LCD) or a light modulating element of other types, and may form an image by illuminating the light modulating element with a light source such as a backlight. As the display element 11, a liquid crystal on silicon (LCOS, LCOS is a trade name), a digital micromirror device, and the like may be used instead of the LCD. Note that the display element 11 may be constituted of a single display element, or may include a plurality of display elements and a synthesizing element such as a dichroic prism and have a configuration in which a plural pieces of light from the plurality of display elements is synthesized by the synthesizing element and emitted.

As illustrated in FIG. 3, the projection lens 21 condenses the imaging light ML emitted from the display element 11 to a state close to a parallel luminous flux. The projection lens 21 is a single lens in the illustrated example, and includes an incident surface 21a and an emitting surface 21b. The prism 22 includes an incident surface 22a, an inner reflection surface 22b, and an emitting surface 22c. In the prism 22, the imaging light ML emitted from the projection lens 21 is refracted at the incident surface 22a to enter the prism 22, is totally reflected at the inner reflection surface 22b, and is refracted at and emitted from the emitting surface 22c. The see-through mirror 23 reflects the imaging light ML emitted from the prism 22 to the pupil position PP, and forms an exit pupil. A position at which the exit pupil is formed is referred to as a pupil position PP. In a predetermined dispersed state or parallel state, imaging light from each point on the display surface 11a enters the pupil position PP in a superposing manner from an angle direction corresponding to a position of each point on the display surface 11a. In the light-guiding optical device 12 of the present exemplary embodiment, a field of view (FOV) is at 44 degrees. A display region of a virtual image formed by the light-guiding optical device 12 is a rectangular shape, and the above-mentioned angle of 44 degrees is an angle in a diagonal direction.

The projection lens 21 and the prism 22 are accommodated together with the display element 11 in a case 51. The case 51 is formed of a shading material, and incorporates a driving circuit (not illustrated) that operates the display element 11. The case 51 has an opening 51a, and the opening 51a has such a size that the imaging light ML from the prism 22 to the see-through mirror 23 does not interfere with the case 51. The opening 51a of the case 51 is covered with a dust-proof cover 52 having optical transparency. The dust-proof cover 52 is formed of a material such as a resin that allows the imaging light ML to pass therethrough without being attenuated. The dust-proof cover 52 enables an accommodation space inside the case 51 to be in a sealed state, and can improve functions such as protection against dust, dew prevention, and contact prevention with respect to an optical surface. The dust-proof cover 52 may not have optical power, or may have optical power.

The see-through mirror 23 is supported on the case 51 through intermediation of a supporting plate 54. The case 51 or the supporting plate 54 is supported on the supporting member 101C illustrated in FIG. 1, and the external member 103 is constituted of the supporting plate 54 and the see-through mirror 23.

The light-guiding optical device 12 is constituted of an off-axis optical system. The projection lens 21, the prism 22, and the see-through mirror 23 are arranged at positions that constitute an off-axis system 112. In the present exemplary embodiment, the off-axis optical system indicates that an entire optical path is bent before or after a light beam enters at least one reflection surface or refraction surface of the projection lens 21, the prism 22, and the see-through mirror 23 that constitute the light-guiding optical device 12. In the light-guiding optical device 12, that is, in the off-axis system 112, an optical axis AX is bent so as to extend along an off-axis plane SO corresponding to the paper plane.

Specifically, when the optical axis AX is bent on the off-axis plane SO, the projection lens 21, the prism 22, and the see-through mirror 23 are arrayed along the off-axis plane SO in the light-guiding optical device 12. The off-axis plane SO is a plane that causes asymmetry on the off-axis system 112 in a multistage manner. In the present specification, the optical axis AX is defined as an axis that extends along an optical path of a main light beam emitted from the center of the display element 11 and passes through an eye ring ER corresponding to an eye point or the center of the pupil. Specifically, the off-axis plane SO on which the optical axis AX is arranged is parallel to the YZ plane, and passes through the center of the display element 11 and the center of the eye ring ER corresponding to the eye point. As viewed in a lateral cross section, the optical axis AX is arranged in a Z-like shape. Specifically, on the off-axis plane SO, the optical axis is folded back twice in a Z-like shape to obtain arrangement of an optical path P1 from the projection lens 21 to the inner reflection surface 22b, an optical path P2 from the inner reflection surface 22b to the see-through mirror 23, and an optical path P3 from the see-through mirror 23 to the pupil position PP.

The optical path P1 from the projection lens 21 to the inner reflection surface 22b in the light-guiding optical device 12 is arranged nearly parallel to the Z direction. Specifically, along the optical path P1, the optical axis AX extends substantially parallel to the Z direction or the frontward direction. The projection lens 21 is arranged at a position sandwiched between the prism 22 and the display element 11 with respect to the Z direction or the frontward direction. In this case, the optical path P1 from the prism 22 to the display element 11 is nearly the frontward direction. It is desired that orientation of the optical axis AX along the optical path P1 fall within a range substantially from −30 degrees to +30 degrees on average, where the downward direction and the upward direction along the Z direction is negative and positive, respectively. When the optical axis AX along the optical path P1 is oriented downward at −30 degrees or greater in the Z direction, the projection lens 21 or the display element 11 can be prevented from interfering with the see-through mirror 23. Further, when the optical axis AX along the optical path P1 is oriented upward at +30 degrees or less in the Z direction, the projection lens 21 and the display element 11 can be prevented from protruding upward, which can avoid obtrusive appearance.

It is desired that the optical axis AX along the optical path P2 from the inner reflection surface 22b to the see-through mirror 23 fall within a range substantially from −70 degrees to −45 degrees on average, where the downward direction and the upward direction along the Z direction is negative and positive, respectively. When the optical axis AX along the optical path P2 is oriented downward at −70 degrees or greater in the Z direction, a space for arranging an inner lens 31 can be secured between the see-through mirror 23 and the pupil position PP, and the entire inclination of the see-through mirror 23 can be prevented from being excessively increased. Further, when the optical axis AX along the optical path P2 is oriented downward at −45 degrees or less in the Z direction, the prism 22 can be prevented from being arranged to largely protrude in the −Z direction or the backward direction with respect to the see-through mirror 23, and the thickness of the light-guiding optical device 12 can be prevented from being increased.

Figure 4:
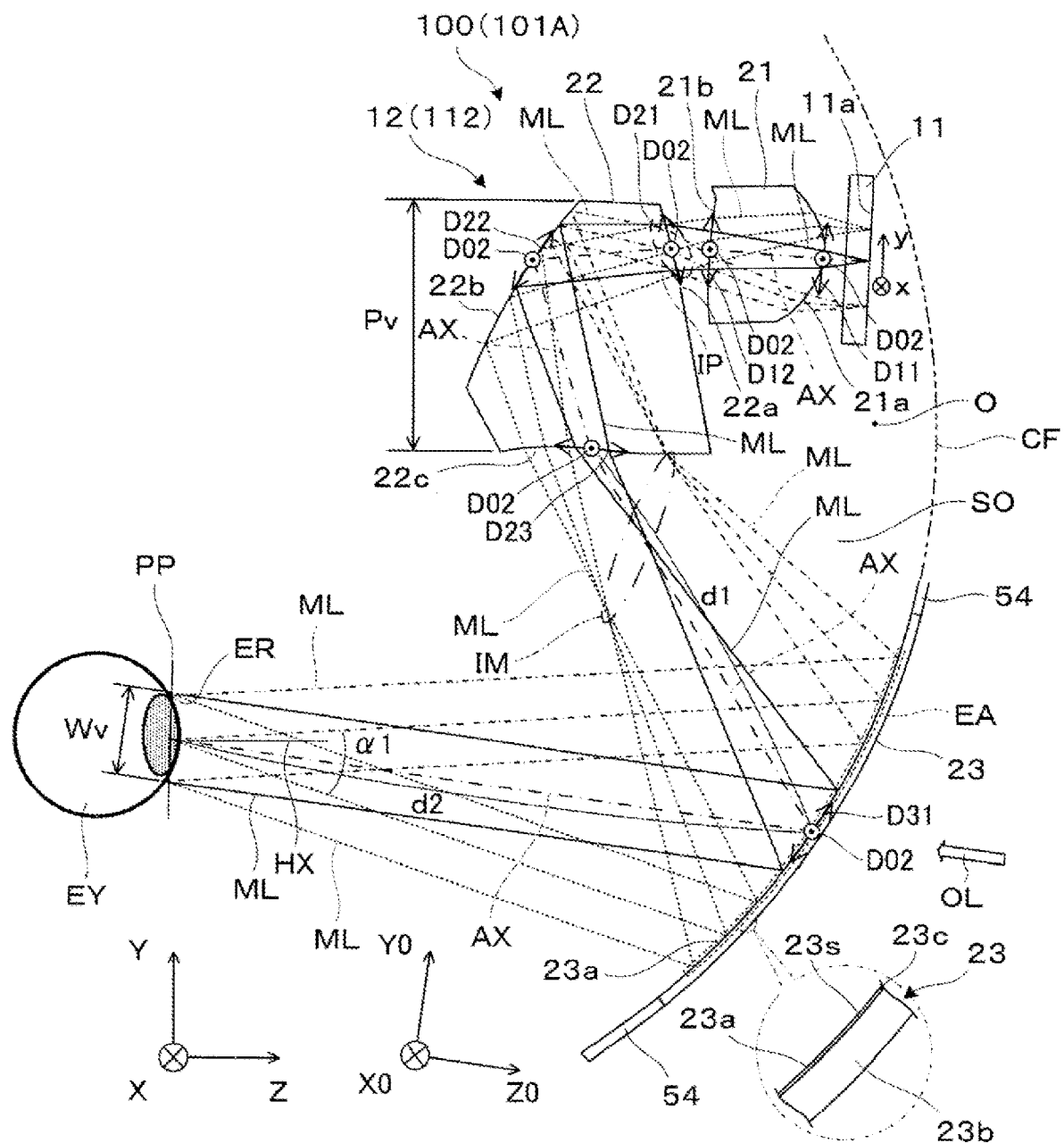
FIG. 4 is a longitudinal cross-sectional view illustrating an optical system of the virtual image display device.

The optical path P3 from the see-through mirror 23 to the pupil position PP is arranged nearly parallel to the Z direction. In the illustrated example, the optical axis AX is oriented at substantially −10 degrees, where the downward direction along the Z direction is negative. This is because a human sight line is stable with slightly lowered eyes when being inclined downward at approximately 10 degrees with respect to the horizontal direction. Note that a center axis HX in the horizontal direction with respect to the pupil position PP, which is illustrated in FIG. 4, is given, assuming that the user US wearing the virtual image display device 100 gazes in the horizontal direction or the horizontal line in an upright and relaxed posture while facing the front. A shape and a posture of a head including arrangement of eyes, arrangement of ears, and the like may vary depending on individual users US wearing the virtual image display device 100. However, an average head shape head posture of a user US is assumed, and hence an average center axis HX can be set for the virtual image display device 100 of interest. From the above results, at the inner reflection surface 22b of the prism 22, a reflection angle of a light beam along the optical axis AX is approximately from 10 degrees to 60 degrees. Further, at the see-through mirror 23, a reflection angle of a light beam along the optical axis AX is approximately from 20 degrees to 45 degrees.

With regard to the optical path P2 and the optical path P3 of the main light beam, a distance d1 between the see-through mirror 23 and the prism 22 is set to be equal to or less than a distance d2 between the see-through mirror 23 and the pupil position PP. In this case, a protruding amount by which the prism 22 protrudes around, that is, above the see-through mirror 23 can be suppressed. In this case, the distances d1 and d2 are distances along the optical axis AX. When another optical element is additionally provided on the optical paths P2 and P3 inside the see-through mirror 23, the values of the distances d1 and d2 may be determined by converting the added optical element into an optical path length or an optical distance.

In the display module 101A, a position of a light beam passing through the uppermost side in the up-and-down direction is equal to or less than 30 mm from the center of the pupil position PP as a reference in the up-and-down direction or the Y direction. When the light beam falls within the range describe above, the projection lens 21 or the display element 11 can be prevented from being arranged to protrude upward or in the +Y direction. With this, an amount by which the projection lens 21 or the display element 11 protrudes above an eyebrow can be suppressed, and designability can be secured. Specifically, the optical unit 102 including the display element 11, the projection lens 21, and the prism 22 can be reduced in size.

Further, in the display module 101A, positions of all the light beams from the see-through mirror 23 to the display element 11 are set to be equal to or greater than 13 mm from the pupil position PP as a reference in the frontward direction or the Z direction. When the light beam falls within the range describe above, particularly, the see-through mirror 23 can be arranged sufficiently away from the pupil position PP in the frontward direction or the +Z direction. With this, a space for arranging the inner lens 31 is secured easily on a reflection surface 23a side of the see-through mirror 23.

Further, in the display module 101A, positions of all the light beams from the see-through mirror 23 to the display element 11 are set to be equal to or less than 40 mm from the pupil position PP as a reference in the frontward direction or the Z direction. When the light beam falls within the range describe above, particularly, the see-through mirror 23 can be prevented from being arranged excessively away from the pupil position PP in the frontward direction or the +Z direction. With this, frontward protrusion of the see-through mirror 23, the display element 11, and the like can be suppressed, and designability can be secured. The lower end of the prism 22 is arranged at a position that is equal to or greater than 10 mm from the center of the pupil position PP as a reference in the up-and-down direction or the Y direction. With this, for example, a see-through visual field at 20 degrees in the upward direction can be secured easily.

On the off-axis plane SO, an intermediate pupil IP is arranged between the projection lens 21 and the inner reflection surface 22b of the prism 22, on a side closer to the incident surface 22a of the prism 22 than the projection lens 21 and the inner reflection surface 22b. More specifically, the intermediate pupil IP is arranged at the position of the incident surface 22a of the prism 22 or in the vicinity of the incident surface 22a. For example, the intermediate pupil IP is arranged on the inner reflection surface 22b side with respect to the incident surface 22a of the prism 22. In this case, the position of the intermediate pupil IP is in a state closer to the incident surface 22a than the inner reflection surface 22b. The intermediate pupil IP may be arranged on the projection lens 21 side with respect to the incident surface 22a of the prism 22. In this case, the position of the intermediate pupil IP is in a state closer to the incident surface 22a than the emitting surface 21b of the projection lens 21. The intermediate pupil IP may intersect with the incident surface 22a of the prism 22. The intermediate pupil IP indicates a position at which imaging light from each point on the display surface 11a spreads most in an overlapping manner, and is arranged at a conjugate point of the eye ring ER or the pupil position PP. An aperture stop may be arranged at the position of or in the vicinity of the intermediate pupil IP.

An intermediate image IM is formed between the prism 22 and the see-through mirror 23. The intermediate image IM is formed at a position closer to the prism 22 than an intermediate point between the see-through mirror 23 and the prism 22. The intermediate image IM is formed in the vicinity of the prism 22 as described above. Thus, a load caused by enlarging an image due to the see-through mirror 23 can be reduced, and an aberration of a virtual image to be observed can be suppressed. However, the intermediate image IM is not in a state of intersecting with the emitting surface 22c of the prism 22. Specifically, the intermediate image IM is formed outside of the emitting surface 22c, and this arrangement relationship is satisfied at any point in the right-and-left direction or the X direction vertical to the off-axis plane SO on the emitting surface 22c as well as on the off-axis plane SO. The intermediate image IM is formed not to traverses the emitting surface 22c of the prism 22 as described above. With this, dust or a scratch on the front surface of the emitting surface 22c can be prevented from affecting image formation.

The intermediate image IM is a real image formed at a position that is upstream of the eye ring ER in the optical path and is conjugate to the display surface 11a of the display element 11. The intermediate image IM has a pattern corresponding to a display image on the display surface 11a. However, the image is not necessarily required to be formed sharply, and may indicate an aberration such as image surface curvature and a distortion aberration. An aberration of the intermediate image IM is not a problem at the time of display, as long as the aberration is finally corrected satisfactorily for a virtual image observed at the pupil position PP.

Figure 5:
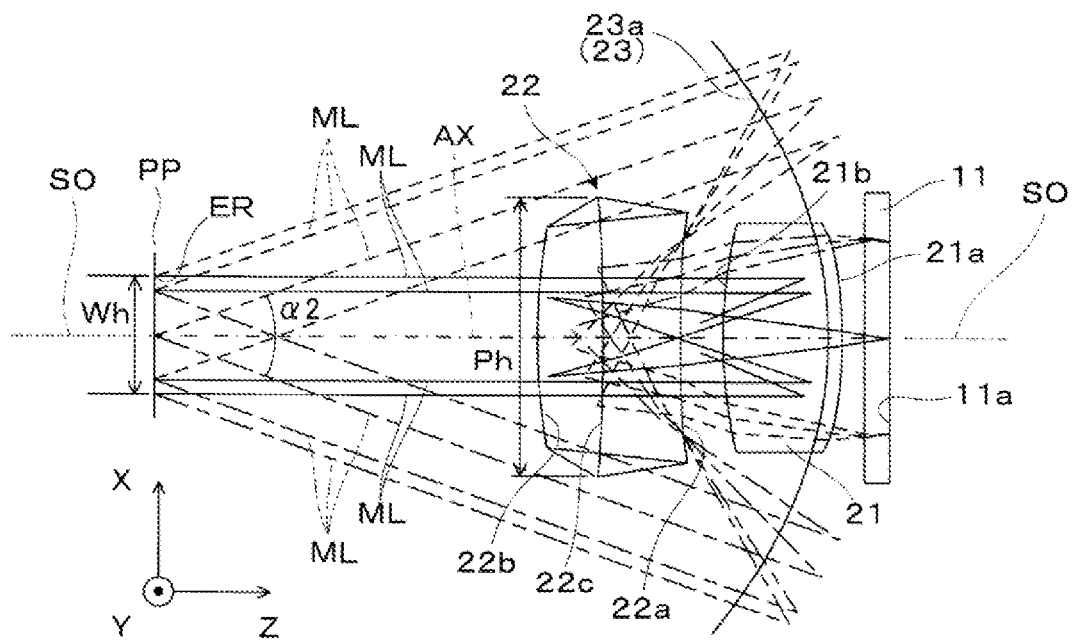
FIG. 5 is a plane cross-sectional view illustrating the optical system of the virtual image display device.

With reference to FIG. 4 and FIG. 5, the shapes of the projection lens 21, the prism 22, and the see-through mirror 23 are described below in detail.

FIG. 4 is a longitudinal cross-sectional view illustrating the light-guiding optical device 12 and the see-through mirror 23. FIG. 5 is a plane cross-sectional view illustrating the light-guiding optical device 12 and the see-through mirror 23. Note that, in FIG. 5, the incident surface 21a and the emitting surface 21b of the projection lens 21, the incident surface 22a, the inner reflection surface 22b, and the emitting surface 22c of the prism 22, and the reflection surface 23a of the see-through mirror 23 are illustrated in a projection state on the XZ plane through the optical axis AX.

The shapes of the incident surface 21a and the emitting surface 21b being optical surfaces constituting the projection lens 21 have asymmetry across the optical axis AX with respect to first directions D11 and D12 in the up-and-down direction intersecting with the optical axis AX on the off-axis plane SO parallel to the YZ plane, and have symmetry across the optical axis AX with respect to the second direction D02 in the right-and-left direction orthogonal to the first directions D11 and D12 or the X direction. The first direction D11 in the up-and-down direction with respect to the incident surface 21a and the first direction D12 in the up-and-down direction with respect to the emitting surface 21b form a predetermined angle.

The projection lens 21 is formed of, for example, a resin, but may also be formed of glass. Each of the incident surface 21a and the emitting surface 21b of the projection lens 21 is constituted of, for example, a free form surface. Note that each of the incident surface 21a and the emitting surface 21b is not limited to a free form surface, and may be an aspheric surface. In the projection lens 21, each pf the incident surface 21a and the emitting surface 21b is formed as a free form surface or an aspheric surface, and thus reduction of an aberration can be achieved. Particularly, when a free form surface is used, an aberration of the light-guiding optical device 12 being an off-axis optical system or a non-coaxial optical system can be reduced easily. Note that the free form surface is a surface without an axis of rotational symmetry, and various polynomials may be used as a surface function of the free form surface. Further, the aspheric surface is a surface having an axis of rotational symmetry, but is a paraboloid or a surface other than a spherical surface expressed by a polynomial. Although detailed description is omitted, an anti-reflection film is formed on each of the incident surface 21a and the emitting surface 21b.

The first direction D11 of the incident surface 21a and the first direction D12 of the emitting surface 21b form a predetermined angle in the projection lens 21 as described above, and hence, in the optical path of the main light beam from the center of the display surface 11a of the display element 11, the emitting surface 21b is formed to be inclined with respect to the incident surface 21a. Specifically, a relative angle or inclination is present between the incident surface 21a and the emitting surface 21b. Thus, in the projection lens 21, eccentricity of the light-guiding optical device 12 as the off-axis system 112 can be partially compensated, which can improve various aberrations. Further, the relative inclination between the incident surface 21a and the emitting surface 21b can partially compensate a chromatic aberration of the projection lens 21.

The prism 22 is a refraction reflection optical member having a combined function of a mirror and a lens. Therefore, the prism 22 refracts and reflects the imaging light ML emitted from the projection lens 21. More specifically, the imaging light ML enters the inside of the prism 22 through the incident surface 22a being a refraction surface, is totally reflected in an irregular reflection direction on the inner reflection surface 22b being a reflection surface, and is emitted outside through the emitting surface 22c being a refraction surface.

The inner reflection surface 22b of the present exemplary embodiment corresponds to the second reflection surface in the scope of the claims.

Each of the incident surface 22a and the emitting surface 22c is an optical surface constituted of a curved surface, and can improve resolution as compared to only a reflection surface or the incident surface 22a and the emitting surface 22c being flat surfaces. The incident surface 22a, the inner reflection surface 22b, and the emitting surface 22c being optical surfaces constituting the prism 22 have non-axisymmetry across the optical axis AX with respect to first directions D21, D22, and D23 in the up-and-down direction intersecting with the optical axis AX on the off-axis plane SO parallel to the YZ plane, and have axisymmetry across the optical axis AX with respect to the second direction D02 in the right-and-left direction orthogonal to the first directions D21, D22, and D23 or the X direction. In the prism 22, a width Ph in the right-and-left direction or the X direction is greater than a vertical width Pv in the up-and-down direction or the Y direction. In the prism 22, the width in the right-and-left direction or the X direction is greater than the width in the up-and-down direction or the Y direction in terms of an optical effective area as well as a physical overall shape. With this, an angle of view in the right-and-left direction or the X direction can be increased. Further, as described later, motion of an eye EY is large in the right-and-left direction. In view of this, even when a sight line is largely changed in the right-and-left direction, an image can be visually recognized.

The prism 22 is formed of, for example, a resin, but may also be formed of glass. A refractive index of the prism 22 is set to be such a value that total reflection by the inner surface can be achieved by considering a reflection angle of the imaging light ML. It is desired that the refractive index or an abbe number of the prism 22 be set by considering a relationship with the projection lens 21. The refractive index and the abbe number of each of the prism 22 and the projection lens are described later in detail.

The optical surface of the prism 22, that is, each of the incident surface 22a, the inner reflection surface 22b, and the emitting surface 22c is constituted of, for example, a free form surface. Note that each of the incident surface 22a, the inner reflection surface 22b, and the emitting surface 22c is not limited to a free form surface, and may be an aspheric surface. In the prism 22, each of the incident surface 22a, the inner reflection surface 22b, and the emitting surface 22c is a free form surface or an aspheric surface, and thus an aberration can be reduced.

Particularly, when a free form surface is used, an aberration of the light-guiding optical device 12 being an off-axis optical system or a non-coaxial optical system can be reduced easily, and resolution can be improved. The inner reflection surface 22b is not limited to a surface that reflects the imaging light ML through total reflection, and may be a reflection surface formed of a metal film or a dielectric multilayer film. In this case, a reflection film constituted of a single layer film or a multilayer film formed of metal such as Al and Ag is formed on the inner reflection surface 22b by vapor deposition or the like. Alternatively, a sheet-like reflection film formed of metal is bonded on the inner reflection surface 22b. Although detailed description is omitted, an anti-reflection film is formed on each of the incident surface 22a and the emitting surface 22c.

The prism 22 can be formed collectively by injection-molding the incident surface 22a, the inner reflection surface 22b, and the emitting surface 22c. Thus, the number of components can be reduced, and the relative positions of the incident surface 22a, the inner reflection surface 22b, and the emitting surface 22c can be achieved to an extent of 20 µm or less, for example, at a relatively low cost and at high accuracy.

The see-through mirror 23 is a plate-like optical member that functions as a concave surface mirror, and reflects the imaging light ML emitted from the prism 22. The see-through mirror 23 covers the pupil position PP at which the eye EY or a pupil is arranged, and has a concave shape as viewed from the pupil position PP. The see-through mirror 23 is constituted of a reflection plate having a structure obtained by forming a mirror film 23c on one front surface 23s of a plate-like body 23b. The reflection surface 23a of the see-through mirror 23 is a front reflection surface having transparency.

The reflection surface 23a of the present exemplary embodiment corresponds to the first reflection surface in the scope of the claims.

The shape of the reflection surface 23a of the see-through mirror 23 has non-axisymmetry across the optical axis AX with respect to a vertical first direction D31 intersecting with the optical axis AX on the off-axis plane SO parallel to the YZ plane, and have axisymmetry across the optical axis AX with respect to the second direction D02 in the right-and-left direction orthogonal to the first direction D31, or the X direction. The reflection surface 23a of the see-through mirror 23 is constituted of, for example, a free form surface. Note that the reflection surface 23a is not limited to a free form surface, and may be an aspheric surface. When the see-through mirror 23 is a free form surface or an aspheric surface, an aberration can be reduced. Particularly, when a free form surface is used, an aberration of the light-guiding optical device 12 being an off-axis optical system or a non-coaxial optical system can be reduced easily.

Even when the reflection surface 23a is any one of a free form surface and an aspheric surface, the see-through mirror 23 has such a shape that an original point O of a curved surface formula is shifted to the projection lens 21 side or the display element 11 side with respect to an effective area EA of the see-through mirror 23. In this case, it is possible to design the inclination surface of the see-through mirror that achieves an optical path having a Z-like shape without requiring an excessive burden on optical design. The above-mentioned curved surface formula of the reflection surface 23a corresponds to the shape of a curved line CF indicated with the two-dot chain line on the off-axis plane SO, for example. Thus, the original point O that gives symmetry is arranged between the upper end of the see-through mirror 23 and the lower end of the display element 11.

The see-through mirror 23 is a reflection element of a transparent type that reflects part of the light entering the see-through mirror 23 and allows the other part of the light to pass therethrough. Specifically, the mirror film 23c of the see-through mirror 23 has semi-transmissive reflectivity. With this, external light OL passes through the see-through mirror 23, and thus see-through view of an external image is enabled, and a user can visually recognize a state obtained by superimposing a virtual image on an external image.

When the plate-like body 23b of the see-through mirror 23 has a thickness of equal to or less than approximately few millimeters, a change in magnification of the external image can be suppressed to low. It is desired that a reflectance of the mirror film 23c with respect to the imaging light ML and the external light OL be set to be equal to or greater than 10% and equal to or less than 50% in a range of an assumed incident angle of the imaging light ML in terms of securing luminance of the imaging light ML and facilitating observation of an external image by see-through.

The plate-like body 23b being a base member of the see-through mirror 23 is formed of, for example, a resin, but may also be formed of glass. The plate-like body 23b is formed of the same material as that of the supporting plate 54 that supports the plate-like body 23b from the periphery thereof, and has the same thickness of that of the supporting plate 54. The mirror film 23c is formed of, for example, a dielectric multilayer film including a plurality of dielectric layers having a film thickness adjusted. The mirror film 23c may also be constituted of a single layer film or a multilayer film formed of metal such as Al and Ag having a film thickness adjusted. The mirror film 23c may be formed by lamination of the above-mentioned film, but may also be formed by bonding a sheet-like reflection film.

The optical path in the light-guiding optical device 12 is described below.

The imaging light ML emitted from the display element 11 passes through the projection lens 21. The imaging light ML passing through the projection lens 21 enters the incident surface 21a of the prism 22 while being refracted, is reflected by the inner reflection surface 22b at a reflectance of nearly 100%, and is refracted again by the emitting surface 22c. The imaging light ML from the prism 22 enters the see-through mirror 23, and is reflected at a reflectance of equal to or less than approximately 50% on the reflection surface 23a. The imaging light ML reflected by the see-through mirror 23 enters the pupil position PP at which the eye EY or the pupil of the user US is arranged.

The intermediate image IM is formed at a position that is between the prism 22 and the see-through mirror 23 and is close to the emitting surface 22c of the prism 22. The intermediate image IM is formed by enlarging an image formed on the display surface 11a of the display element 11. Further, in addition to the imaging light ML, the external light OL passing through the see-through mirror 23 or the supporting plate 54 in the periphery of the see-through mirror 23 enters the pupil position PP. Specifically, the user US wearing the virtual image display device 100 can observe a virtual image of the imaging light ML, which is superposed on an external image.

As apparent from the comparison between FIG. 4 and FIG. 5, with regard to the FOV of the light-guiding optical device 12, a visual field angle α2 in the right-and-left direction is greater than a visual field angle α1 in the up-and-down direction. This corresponds to the fact that the image formed on the display surface 11a of the display element 11 is longer in the horizontal direction than in the vertical direction. An aspect ratio of the dimension of the display surface 11a in the right-and-left direction to the dimension thereof in the up-and-down direction is set to be a value of, for example, 4:3 or 16:9.

Figure 6:
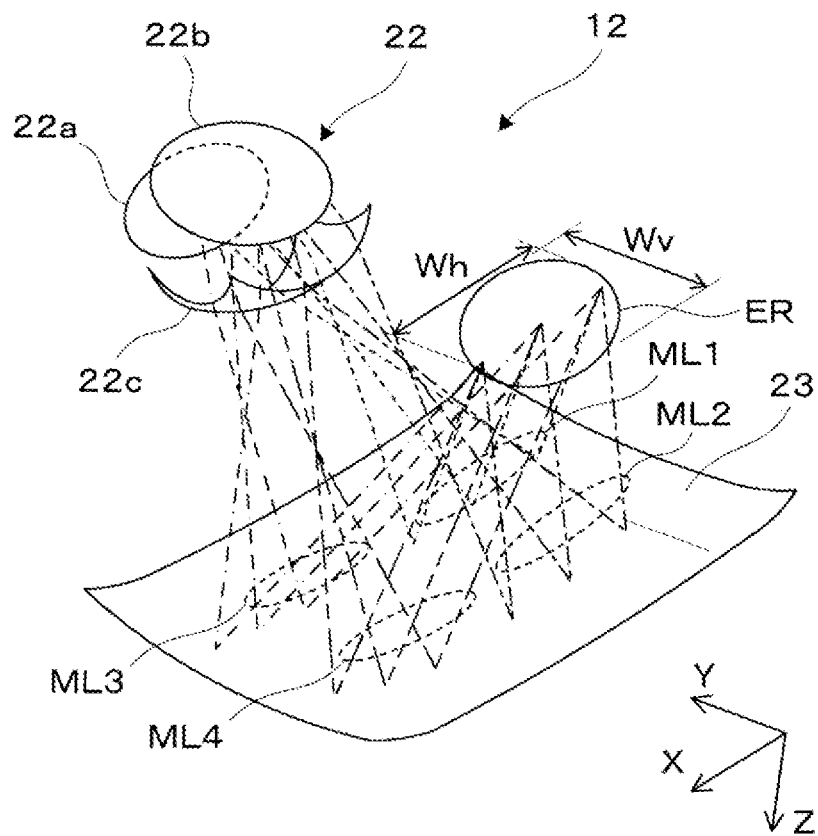
FIG. 6 is a perspective view for conceptually describing image formation by a projection optical system.

FIG. 6 is a perspective view for conceptually describing image formation by the light-guiding optical device 12.

In FIG. 6, the imaging light ML1 indicates a light beam from the upper right direction in the visual field, the imaging light ML2 indicates a light beam from the lower right direction in the visual field, the imaging light ML3 indicates a light beam from the upper left direction in the visual field, and the imaging light ML4 indicates a light beam from the lower left direction in the visual field.

In this case, the eye ring ER set as the pupil position PP has such an eye ring shape or pupil size that a pupil size Wh in the right-and-left direction or the X direction vertical to the off-axis plane SO is greater than a pupil size Wv in the up-and-down direction or the Y direction that is on the off-axis plane SO and is orthogonal to the optical axis AX. Specifically, the pupil size at the pupil position PP is wider in the right-and-left direction or the X direction orthogonal to the off-axis plane SO than in the up-and-down direction or the Y direction orthogonal to the right-and-left direction.

In a case in which the angle of view or the visual field in the right-and-left direction is greater than the angle of view or the visual field in the up-and-down direction, when a sight line is changed according to the angle of view, the position of the eye moves largely in the right-and-left direction. Thus, it is desired that the pupil size be increased in the right-and-left direction. Specifically, the pupil size Wh of the eye ring ER in the right-and-left direction is greater than the pupil size Wv in the up-and-down direction. With this, when a sight line is largely changed in the right-and-left direction, cutting of an image can be prevented or suppressed. In a case of the light-guiding optical device 12 illustrated in FIG. 4 and FIG. 5, the FOV in the right-and-left direction is relatively large, and the FOV in the up-and-down direction is relatively small. As a result, the eye EY or the pupil of the user US also rotates in a large angle range in the right-and-left direction, and rotates in a small angle range in the up-and-down direction. Thus, according to motion of the eye EY, the pupil size Wh of the eye ring ER in the right-and-left direction is greater than the pupil size Wv of the eye ring ER in the up-and-down direction.

As is apparent from the description given above, for example, when the FOV of the light-guiding optical device 12 in the up-and-down direction is set to be greater than the FOV in the right-and-left direction, it is desired that the pupil size Wh of the eye ring ER in the right-and-left direction be smaller than the pupil size Wv of the eye ring ER in the up-and-down direction. In the above description, when the optical axis AX from the see-through mirror 23 to the pupil position PP is oriented downward, the inclination of the eye ring ER and the size of the eye ring ER in a strict sense are required to be considered with a coordinate system of X0, Y0, and Z0 as references, which have the optical axis AX as the Z0 direction and are inclined downward. In this case, the Y0 direction in the up-and-down direction does not strictly match with the vertical direction or the Y direction. However, when this inclination is not large, the inclination of the eye ring ER and the size of the eye ring ER may be considered with the coordinate system of X, Y, and Z, which does not cause a problem in an approximate sense.

Although omitted in illustration, when the FOV of the light-guiding optical device 12 is greater in the right-and-left direction than in the up-and-down direction according to a size relationship relating to the eye ring ER between the pupil size Wh in the right-and-left direction and the pupil size Wv in the up-and-down direction, it is desired that, also with regard to the intermediate pupil IP, the pupil size in the right-and-left direction corresponding to the X direction be smaller than the pupil size in the up-and-down direction corresponding to the Y direction.

Figure 7:
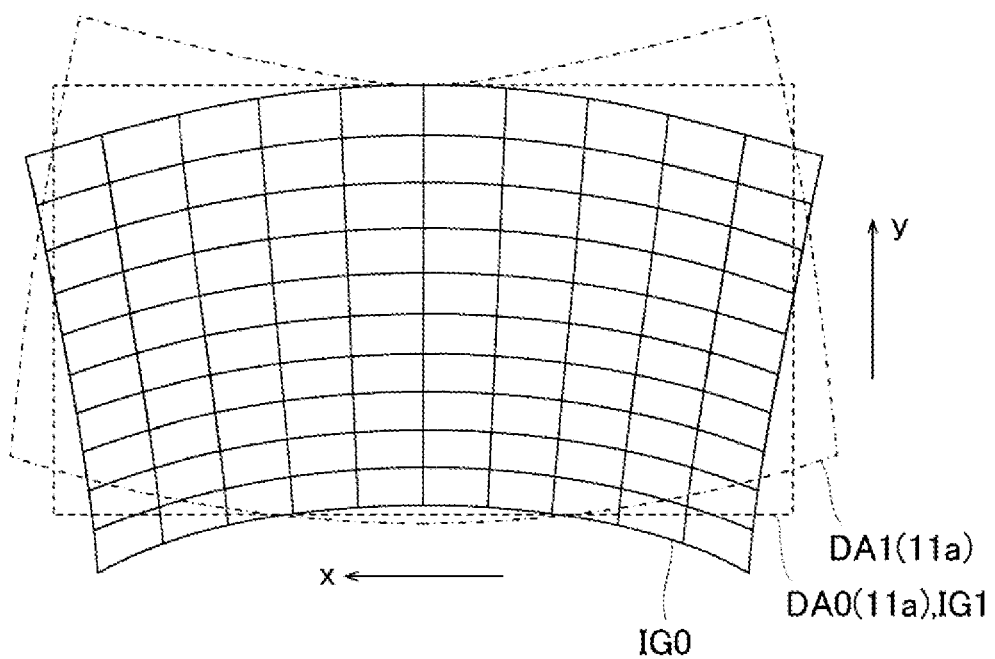
FIG. 7 is a view for describing distortion correction in a display element.

As illustrated in FIG. 7, in the display module 101A of the present exemplary embodiment, an original projection image IG0 indicating an image formation state has a relatively large distortion aberration. However, the light-guiding optical device 12 is the off-axis system 112, and hence it is not easy to eliminate distortion such as a trapezoidal distortion. Therefore, even when a distortion aberration remains in the light-guiding optical device 12, when the original display image is indicated with DA0, an image formed on the display surface 11a of the display element 11 is referred to as a correction image DA1 having distortion in advance. Specifically, the image formed on the display element 11 is referred to as the correction image DA1 having an inverse distortion that cancels a distortion aberration formed by the projection lens 21, the prism 22, and the see-through mirror 23.

With this, a pixel array of a projection image IG1 being a virtual image observed at the pupil position PP via the light-guiding optical device 12 can be obtained as a grid pattern corresponding to the display image DA0 having no distortion, and the projection image IG1 can have a rectangular contour. As a result, an aberration can be suppressed in the display module 101A as a whole including the display element 11, while a distortion aberration caused at the light-guiding optical device 12 is allowed. When the display surface 11a has a rectangular outline, a margin is formed in the peripheral portion of the display surface 11a by forming a compulsory distortion, but additional information may be displayed in such a margin. The correction image DA1 formed on the display surface 11a is not limited to a display image in which a compulsory distortion is formed by image processing, and, for example, an array of display pixels formed on the display surface 11a may correspond to a compulsory distortion. In this case, image processing for correcting the distortion is not needed. Further, the display surface 11a may be curved to correct an aberration.

As described above, the distortion caused by the light-guiding optical device 12 can be corrected by adding, to the image displayed on the display element 11, the distortion that cancels the distortion caused by the light-guiding optical device 12 or the like. In other words, the distortion aberration caused by the light-guiding optical device 12 or the like can be corrected by the display element 11, and hence an optical system allowing occurrence of a distortion aberration can be employed. With this, the number of components of the display module can be reduced, and the display module can be reduced in size.

However, even when a distortion aberration can be corrected by the above-mentioned method, there arises a problem that a chromatic aberration such as an axial chromatic aberration and a chromatic aberration of magnification is caused due to wavelength dispersion of each of the optical members constituting the light-guiding optical device 12, which causes color slurring in an image. Therefore, color slurring in an image can be improved by correcting each of an axial chromatic aberration and a chromatic aberration of magnification. However, there has not hitherto been proposed a method of correcting a chromatic aberration caused in the light-guiding optical device having non-axisymmetry in the up-and-down direction as in the present exemplary embodiment.

A configuration of the display module 101A for reducing the chromatic aberration as described above is described below in detail.

Figure 8:
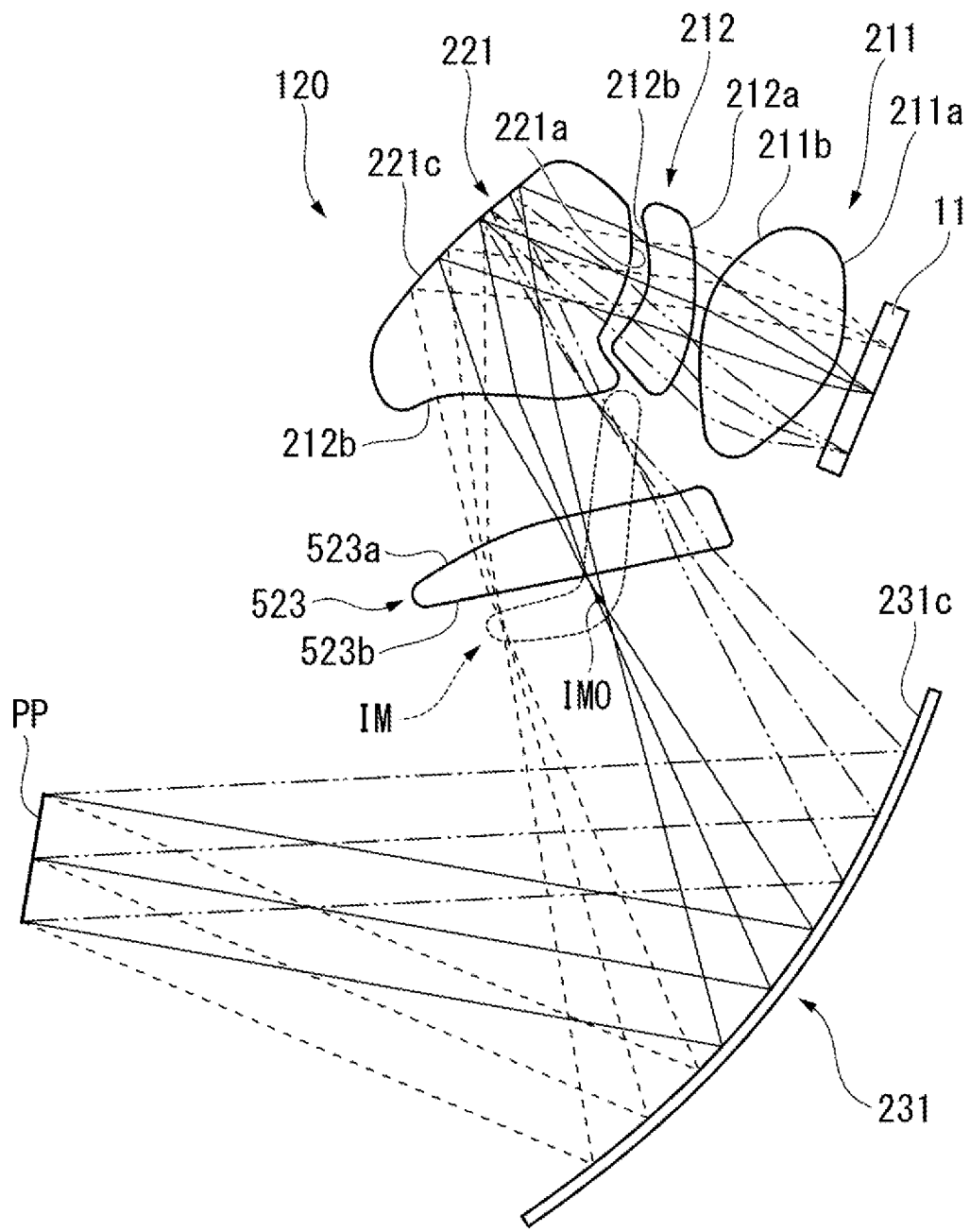
FIG. 8 is a view illustrating a configuration of a light-guiding optical device for reducing an axial chromatic aberration.

FIG. 8 is a view illustrating a configuration of a light-guiding optical device 120 for reducing an axial chromatic aberration. In FIG. 8, an attention is paid to a pixel on the upper end, a pixel in the center, and a pixel on the lower end among the plurality of pixels of the display element 11, which are arrayed in the up-and-down direction, and optical paths of imaging light emitted from those pixels are illustrated.

As illustrated in FIG. 8, the light-guiding optical device 120 of the present exemplary embodiment is constituted of an optical system having non-axisymmetry in the up-and-down direction of the image of an image and axisymmetry in the right-and-left direction of the image. The light-guiding optical device 120 includes a first lens 211, a second lens 212, a prism 221, a third lens 523, and a see-through mirror 231.

The first lens 211 has light transmittance, and has positive refractivity. The first lens 211 includes an incident surface 211a and an emitting surface 211b each of which is constituted of a free form surface. The second lens 212 has light transmittance, and has positive refractivity. The second lens 212 includes an incident surface 212a and an emitting surface 212b each of which is constituted of a free form surface. The first lens 211 and the second lens 212 function as the projection lens 21 in the basic configuration illustrated in FIG. 3.

The first lens 211 of the present exemplary embodiment corresponds to the first optical member in the scope of the claims. The second lens 212 of the present exemplary embodiment corresponds to the second optical member in the scope of the claims.

In the present exemplary embodiment, refractivity of the first lens 211 is greater than refractivity of the second lens 212. An abbe number of a constituent material of the first lens 211 is greater than an abbe number of a constituent material of the second lens 212. The first lens 211 is made of a material having a refractive index of approximately 1.5 and an abbe number from 50 to 60, for example. The second lens 212 is made of a material having a refractive index of approximately 1.6 and an abbe number from 20 to 30, for example. Specifically, the first lens 211 is made of a material such as a cycloolefin polymer (COP) resin and an acrylic resin. The second lens 212 is made of a material such as an optical polyester resin and a polycarbonate resin.

The prism 221 includes an inner reflection surface 221c that reflects imaging light emitted from the second lens 212. The prism 221 includes an incident surface 221a, the inner reflection surface 221c, and an emitting surface 221b each of which is constituted of a free form surface. The third lens 523 has light transmittance, and has positive refractivity. The third lens 523 includes an incident surface 523a constituted of a free form surface and an emitting surface 523b constituted of a flat surface. The third lens 523 functions as the dust-proof cover 52 in the basic configuration illustrated in FIG. 3. In the see-through mirror 231, imaging light emitted from the third lens 523 toward the pupil position PP is reflected at a reflection surface 231c, and thus an image is formed.

The reflection surface 231c of the see-through mirror 231 of the present exemplary embodiment corresponds to the first reflection surface in the scope of the claims. The inner reflection surface 221c of the prism 221 of the present exemplary embodiment corresponds to the second reflection surface in the scope of the claims.

In the present exemplary embodiment, a refractive index and an abbe number of the prism 221 are the same as the refractive index and the abbe number of the first lens 211. Further, a refractive index and an abbe number of the third lens 523 are the same as the refractive index and the abbe number of the second lens 212. Therefore, the prism 221 is made of a material having a refractive index of approximately 1.5 and an abbe number from 50 to 60, for example.

The third lens 523 is made of a material having a refractive index of approximately 1.6 and an abbe number from 20 to 30, for example. Specifically, the prism 221 is made of a material such as a COP resin. The third lens 523 is made of a material such as an optical polyester resin and a polycarbonate resin.

In the present exemplary embodiment, the first lens 211 and the second lens 212 are arranged between the display element 11 and the prism 221. Further, the third lens 523 is arranged between the prism 221 and the see-through mirror 231, more specifically, between an intermediate image IMO of the intermediate image IM and the emitting surface 221b of the prism 221, the intermediate image IMO being formed by imaging light emitted from the center pixel of the display element 11.

It is desired that, as described above, the combination of the first optical member having relatively large power and a relatively large abbe number and the second optical member having relatively small power and a relatively small abbe number be arranged between the display element 11 and the intermediate image IMO formed by the imaging light emitted from the center pixel of the display element 11. With this configuration, an axial chromatic aberration due to the light-guiding optical device 12 can be reduced. However, even when an axial chromatic aberration can be successfully reduced by using the light-guiding optical device 12 having the above-mentioned configuration, it is difficult to reduce a chromatic aberration of magnification without increasing the size of the light-guiding optical device 12.

Generally, a degree of a distortion aberration is different for each color light forming a projection image, and hence color slurring is caused. When the configuration of the light-guiding optical device 12 is changed, a chromatic aberration of magnification of this type can be reduced, and color slurring can also be improved. However, in this case, a large number of optical members for correcting a chromatic aberration of magnification are required in the light-guiding optical device 12, which causes a problem of complicating the configuration of the light-guiding optical device 12 and increasing the size.

In view of this, in the present exemplary embodiment, the control unit 25 corrects a chromatic aberration of magnification.

Figure 10:
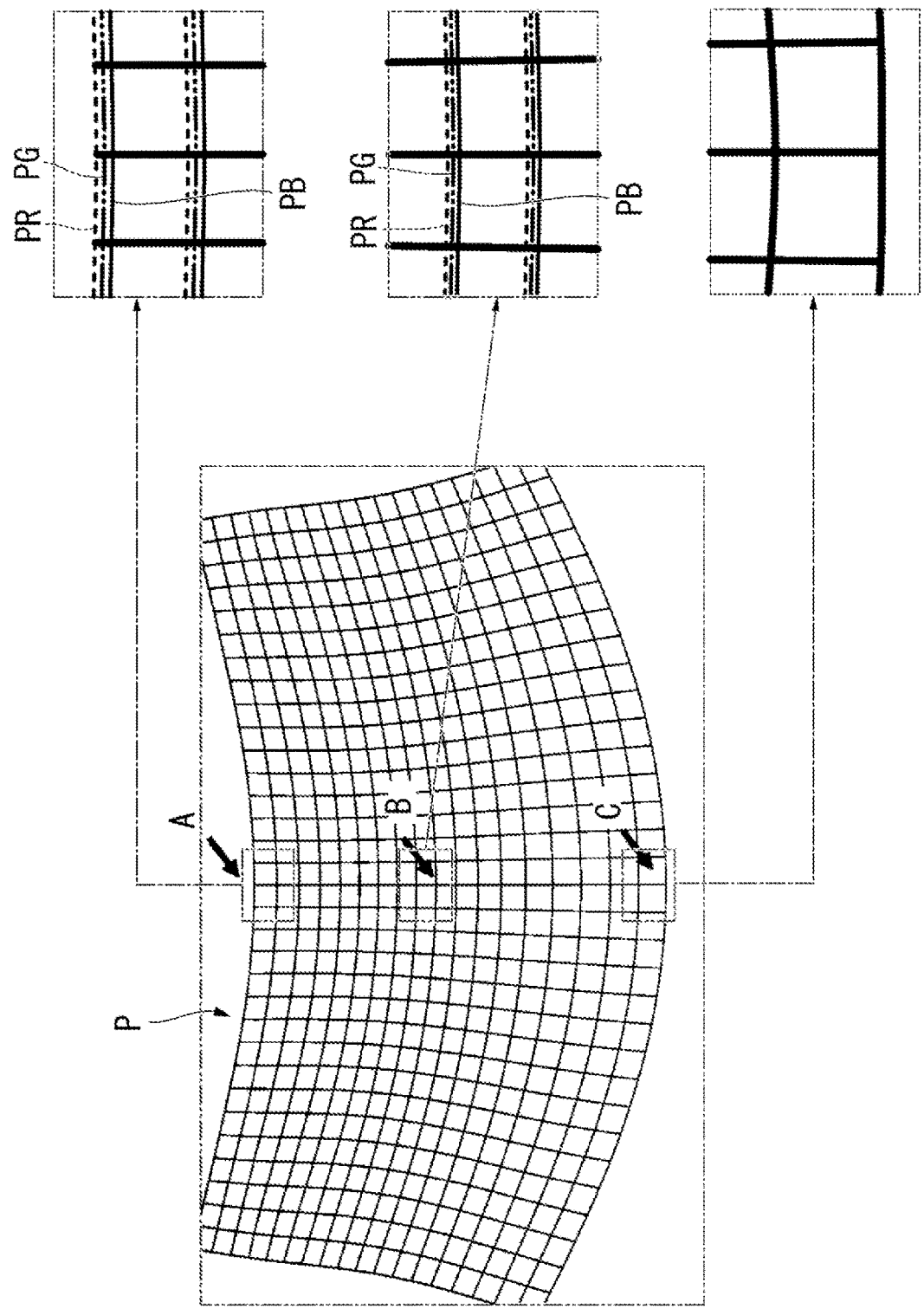
FIG. 10 is a view for describing a method of correcting a chromatic aberration of magnification on the display element.

FIG. 10 is a view for describing a method of correcting a chromatic aberration of magnification on the display element 11, based on a simulation conducted by the inventors.

When a grid pattern is displayed on the display element 11, a projection image influenced by a distortion aberration of the light-guiding optical device 12 is formed. In the projection image, parts close to a right side and a left side with respect to a center part in the right-and-left direction are distorted downward. In the display module 101A of the present exemplary embodiment, one intermediate image IM is formed, and hence the up-and-down direction of the image on the display element 11 and the up-and-down direction of the projection image are inversed. Therefore, correction is performed on the display element 11 so as to form an image P in which, as illustrated in FIG. 10, parts close to a right side and a left side with respect to a center part in the right-and-left direction are distorted upward in a direction opposite to the distortion of the projection image described above.

Specifically, as illustrated in FIG. 10, when a grid pattern is displayed as the image P on the display element 11, the image P in which the parts close to the right side and the left side with respect to the center part in the right-and-left direction are distorted upward is formed so as to correct a distortion aberration of the light-guiding optical device 12. In the center part of the image P on the display element 11 in the right-and-left direction, a position shift due to color light is rarely caused at a lower end part C. In contrast, a position shift is caused at a center part B and an upper part A, a red image PR is shifted upward with respect to a green image PG, and a blue image PB is shifted downward with respect to the green image PG. Further, the shift amounts of the red image PR and the blue image PB with respect to the green image PG are greater at the upper part A than at the center part B. The shift amount of the red image PR and the blue image PB with respect to the green image PG are approximately several tens of micrometers at the upper part A, for example. Therefore, in the up-and-down direction of the image P on the display element 11, a distortion correction amount at a first position is greater than a distortion correction amount at a second position lower than the first position.

FIG. 9 is a block diagram illustrating a configuration of the control unit 25.

As illustrated in FIG. 9, the control unit 25 includes the image input unit 250, a first distortion correction unit 251, a second distortion correction unit 252, an EEPROM 255, a first panel driver 253, and a second panel driver 254. The control unit 25 of the present exemplary embodiment performs distortion correction in the up-and-down direction of the image by a distortion correction amount different for each color light. As a specific configuration example, the control unit 25 may be constituted of a digital circuit such as a field programmable gate array (FPGA) and an ASIC, a processor such as a CPU, or the like.

An image signal D1 is transmitted to the image input unit 250 from an image supply device (not illustrated) via wired communication or wireless communication. The image supply device is a personal computer, a mobile communication terminal, a DVD player, or the like. The control unit 25 corrects the image signal D1 input to the control unit 25 to a first correction image signal D3R, based on a chromatic aberration of magnification caused in the light-guiding optical device 12 of the first display module 101A for the right eye, and emits first imaging light from the first display element 11A, based on the first correction image signal D3R. The details thereof are described later. Further, the control unit 25 corrects the image signal D1 input to the control unit 25 to a second correction image signal D3L, based on a chromatic aberration of magnification caused in the light-guiding optical device 12 of the second display module 101B for the left eye, and emits second imaging light from the second display element 11B, based on the second correction image signal D3L.

The image input unit 250 executes predetermined image processing based on the image signal D1 input to the image input unit 250, and outputs image signals D2R and D2L obtained by the image processing. The image input unit 250 executes gamma correction processing, brightness correction processing, and the like as the predetermined image processing. The image input unit 250 divides the image signal D1 into the first image signal D2R for the right eye and the second image signal D2L for the left eye, and outputs the signals to the first distortion correction unit 251 and the second distortion correction unit 252, respectively, in a branching manner.

A plurality of distortion coefficients each corresponding to any of a red signal, a green signal, and a blue signal constituting the first image signal D2R for the right eye and a red signal, a green signal, and a blue signal constituting the second image signal D2L for the left eye are stored in the EEPROM 255 via an external computer 27. A degree of distortion of the correction image can be adjusted by a value of the distortion coefficient. The distortion coefficients stored in the EEPROM 255 can be re-written by the external computer 27. Note that the external computer 27 may be removable from the virtual image display device 100, and may not be included in the configuration of the virtual image display device 100.

The first distortion correction unit 251 corrects the first image signal D2R so that distortion for canceling distortion of a virtual image formed by the light-guiding optical device 12 of the first display module 101A is applied to a first image, and outputs the first image signal D2R that is corrected, as the first correction image signal D3R to the first panel driver 253. In this case, the first distortion correction unit 251 performs distortion correction while referring to a distortion coefficient optimal for each color among the distortion coefficients stored in the EEPROM 255, and generates the first correction image signal D3R.

Similarly to the first distortion correction unit, the second distortion correction unit corrects the second image signal D2L so that distortion for canceling distortion of a virtual image formed by the light-guiding optical device of the second display module is applied to a second image, and outputs the second image signal D2L that is corrected, as the second correction image signal D3L to the second panel driver. In this case, the second distortion correction unit performs distortion correction while referring to a distortion coefficient optimal for each color among the distortion coefficients stored in the EEPROM, and generates the second correction image signal D3L.

In the display module 101A of the present exemplary embodiment, the light-guiding optical device 12 including the first lens 211 and the second lens 212 having abbe numbers that are different from each other is used. Thus, an axial chromatic aberration caused by the light-guiding optical device 12 is corrected, and a remaining chromatic aberration of magnification is further corrected by the control unit 25 in the display element 11. Specifically, correction of an axial chromatic aberration is allotted to the light-guiding optical device 12 in an optical manner, and correction of a chromatic aberration of magnification is allotted to the control unit 25 during the image processing. With this, according to the present exemplary embodiment, correction of an axial chromatic aberration and correction of a chromatic aberration of magnification can be performed as appropriate, and a virtual image with high image quality and less color slurring can be obtained, while increase in size of the display module 101A is avoided.

Further, the control unit 25 of the present exemplary embodiment is not required to include a distortion correction unit for each color, and can achieve distortion correction with the distortion correction units 251 and 252 that are commonly shared by using a different distortion coefficient for each color. Thus, the control unit 25 can be achieved at a low cost.

Second Exemplary Embodiment

Figure 11:
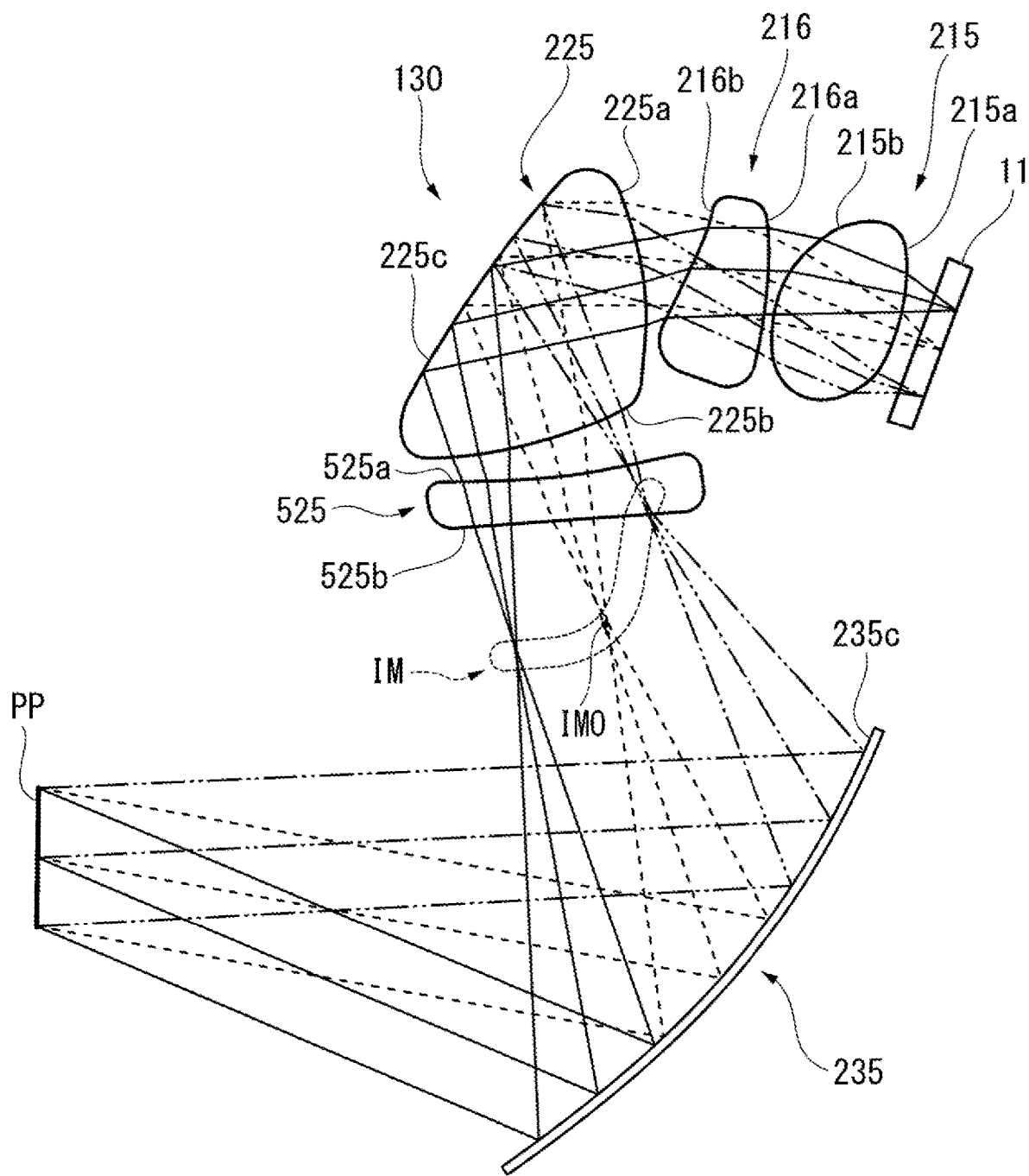
FIG. 11 is a view illustrating a configuration of a light-guiding optical device for reducing an axial chromatic aberration in a virtual image display device of a second exemplary embodiment.
Figure 12:
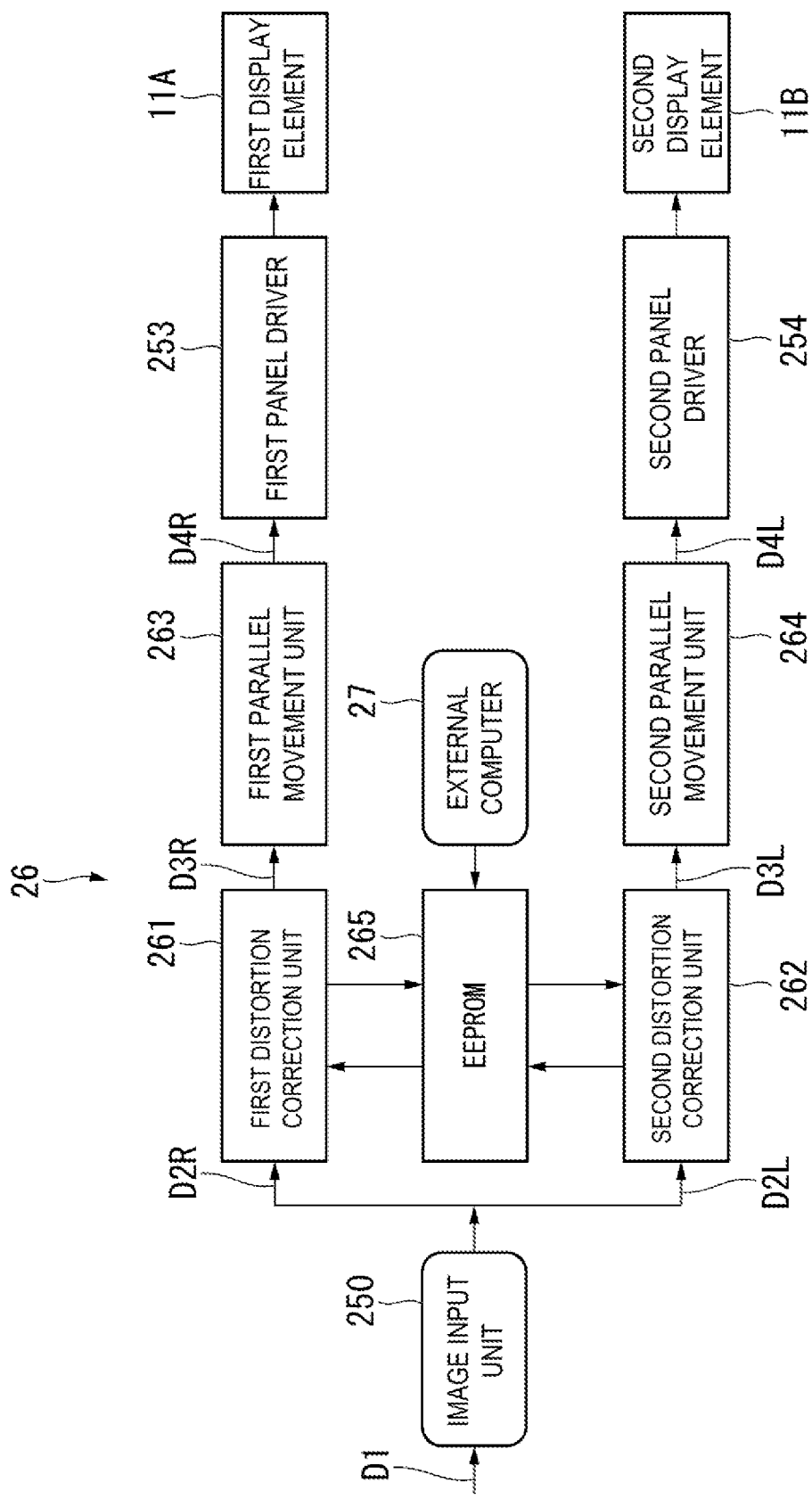
FIG. 12 is a block diagram illustrating a configuration of a control unit.
Figure 13:
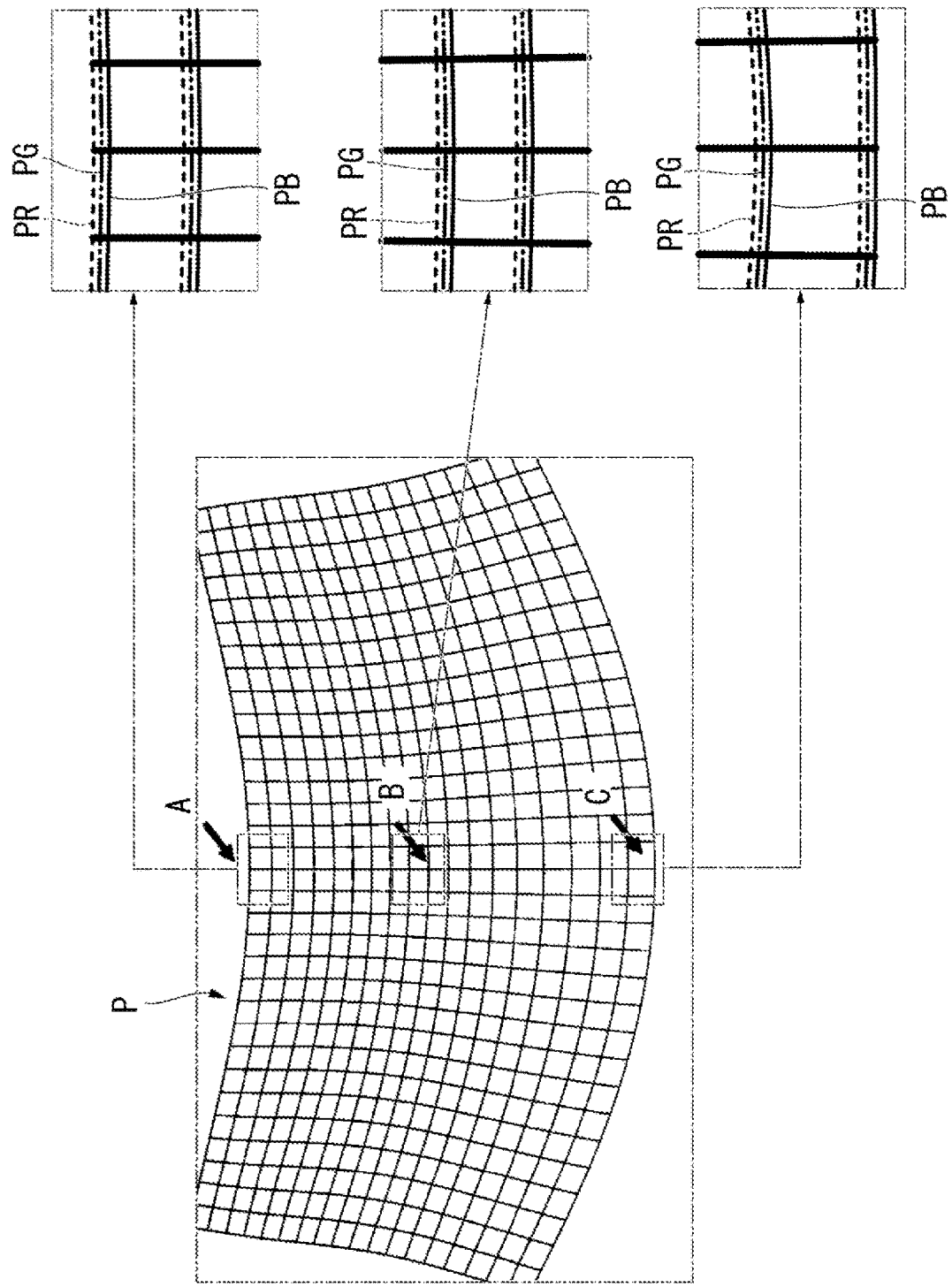
FIG. 13 is a view for describing a method of correcting a chromatic aberration of magnification on a display element.

With reference to FIG. 11 to FIG. 13, a second exemplary embodiment of the present disclosure is described below.

The basic configuration of a virtual image display device of the second exemplary embodiment is similar to that of the first exemplary embodiment, but includes a display module having a configuration different from that of the first exemplary embodiment. Therefore, the overall configuration of the virtual image display device is omitted in description. FIG. 11 is a view illustrating a configuration of a light-guiding optical device for reducing an axial chromatic aberration in the virtual image apparatus of the second exemplary embodiment.

In FIG. 11, the components common to those of the drawings used in the first exemplary embodiment are denoted with the same reference symbols, and the description thereof is omitted.

FIG. 11 is a view illustrating a configuration of a light-guiding optical device 130 for reducing an axial chromatic aberration in the display module of the present exemplary embodiment. In FIG. 11, an attention is paid to a pixel on the upper end, a pixel in the center, and a pixel on the lower end among the plurality of pixels of the display element 11, which are arrayed in the up-and-down direction, and optical paths of imaging light emitted from those pixels are illustrated.

As illustrated in FIG. 11, the light-guiding optical device 130 of the present exemplary embodiment is constituted of an optical system having non-axisymmetry in the up-and-down direction of an image and have axisymmetry in the right-and-left direction of the image. The light-guiding optical device 130 includes a first lens 215, a second lens 216, a prism 225, a third lens 525, and a see-through mirror 235.

The first lens 215 has light transmittance, and has positive refractivity. The first lens 215 includes an incident surface 215a and an emitting surface 215b each of which is constituted of a free form surface. The second lens 216 has light transmittance, and has positive refractivity. The second lens 216 includes an incident surface 216a and an emitting surface 216b each of which is constituted of a free form surface.

The first lens 215 of the present exemplary embodiment corresponds to the first optical member in the scope of the claims. The second lens 216 of the present exemplary embodiment corresponds to the second optical member in the scope of the claims.

In the present exemplary embodiment, refractivity of the first lens 215 is greater than refractivity of the second lens 216. An abbe number of a constituent material of the first lens 215 is greater than an abbe number of a constituent material of the second lens 216. The first lens 215 is made of a material having a refractive index of approximately 1.5 and an abbe number from 50 to 60, for example. The second lens 216 is made of a material having a refractive index of approximately 1.6 and an abbe number from 20 to 30, for example. Specifically, the first lens 215 is made of a material such as a COP resin. The second lens 216 is made of a material such as an optical polyester resin and a polycarbonate resin.

The prism 225 includes an inner reflection surface 225c that reflects imaging light emitted from the second lens 216. The prism 225 includes an incident surface 225a, the inner reflection surface 225c, and an emitting surface 225b each of which is constituted of a free form surface. The third lens 525 has light transmittance, and has positive refractivity. The third lens 525 includes an incident surface 525a constituted of a free form surface and an emitting surface 525b constituted of a flat surface. In the see-through mirror 235, imaging light emitted from the third lens 525 toward the pupil position PP is reflected at a reflection surface 235c, and thus an image is formed.

The reflection surface 235c of the see-through mirror 235 of the present exemplary embodiment corresponds to the first reflection surface in the scope of the claims. The inner reflection surface 225c of the prism 225 of the present exemplary embodiment corresponds to the second reflection surface in the scope of the claims.

In the present exemplary embodiment, a refractive index and an abbe number of the prism 225 are the same as the refractive index and the abbe number of the first lens 215. Further, a refractive index and an abbe number of the third lens 525 are the same as the refractive index and the abbe number of the second lens 216. The prism 225 is made of a material having a refractive index of approximately 1.5 and an abbe number from 50 to 60, for example. The third lens 525 is made of a material having a refractive index of approximately 1.6 and an abbe number from 20 to 30, for example. Specifically, the prism 225 is made of a material such as a COP resin. The third lens 525 is made of a material such as an optical polyester resin or a polycarbonate resin.

In the present exemplary embodiment, the first lens 215 and the second lens 216 are arranged between the display element 11 and the prism 225. Further, the third lens 525 is arranged between the prism 225 and the see-through mirror 235, more specifically, between the emitting surface 225b of the prism 225 and the intermediate image IMO, of the intermediate image IM, formed by imaging light emitted from the center pixel of the display element 11.

As described above, the combination of the first optical member having relatively large power and a relatively large abbe number and the second optical member having relatively small power and a relatively small abbe number is arranged between the display element 11 and the intermediate image IMO, of the intermediate image IM, formed by the imaging light emitted from the center pixel of the display element 11. With this configuration, an axial chromatic aberration due to the light-guiding optical device 130 can be reduced. However, even when the light-guiding optical device 130 having the above-mentioned configuration is used, it is difficult to reduce a chromatic aberration of magnification without increasing the size of the light-guiding optical device.

FIG. 13 is a view for describing a method of correcting a chromatic aberration of magnification on the display element 11 of the present exemplary embodiment.

When a grid pattern is displayed on the display element 11, a projection image influenced by a distortion aberration of the light-guiding optical device 12 is formed. In the projection image, parts close to a right side and a left side with respect to a center part in the right-and-left direction are distorted downward. Similarly to that in the first exemplary embodiment, in the display module 101A of the present exemplary embodiment, one intermediate image IM is formed, and hence the up-and-down direction of the image on the display element 11 and the up-and-down direction of the projection image are inversed. Therefore, correction is performed on the display element 11 so as to form the image P in which, as illustrated in FIG. 13, the parts close to the right side and the left side with respect to the center part in the right-and-left direction are distorted upward in the direction opposite to the distortion of the projection image described above.

Specifically, as illustrated in FIG. 13, when a grid pattern is displayed as the image P on the display element 11, the image P in which the parts close to the right side and the left side with respect to the center part in the right-and-left direction are distorted upward is formed so as to correct a distortion aberration of the light-guiding optical device 12. However, in the present exemplary embodiment, a substantially even position shift is caused from the lower end part C to the upper part A, which is different from the first exemplary embodiment. Specifically, in all of the lower end part C, the center part B, and the upper part A, the red image PR is shifted upward with respect to the green image PG, and the blue image PB is shifted downward with respect to the green image PG. Further, the shift amount of the red image PR with respect to the green image PG and the shift amount of the blue image PB with respect to the green image PG are substantially the same at all the positions.

Specifically, in the present exemplary embodiment, a degree of distortion, that is, a degree of a distortion aberration of the projection image is substantially the same for all the color light components, and the projection image formed by each color light moves in parallel in the up-and-down direction. Thus, a position shift of an image formed by each color light is evenly caused at all the positions on the display element 11 in the up-and-down direction.

FIG. 12 is a block diagram illustrating a configuration of a control unit 26 of the present exemplary embodiment.

As illustrated in FIG. 12, the control unit 26 includes the image input unit 250, a first distortion correction unit 261, a second distortion correction unit 262, an EEPROM 265, a first parallel movement unit 263, a second parallel movement unit 264, the first panel driver 253, and the second panel driver 254. The control unit 26 of the present exemplary embodiment performs distortion correction for images of different colors by the same distortion correction amount, and performs display for each color by shifting a display position of each image corresponding to color light subjected to distortion correction.

The functions of the image input unit 250 are similar to those in the first exemplary embodiment. Specifically, the image input unit 250 executes image processing such as gamma correction processing and brightness correction processing, based on the image signal D1 input to the image input unit 250, and outputs the first image signal D2R and the second image signal D2L obtained by the image processing.

Respective distortion coefficients corresponding to the first image signal D2R for the right eye and the second image signal D2L for the left eye are stored in the EEPROM 265 via the external computer 27. The distortion coefficients stored in the EEPROM 265 can be re-written by the external computer 27. In the present exemplary embodiment, it is not required to store a different distortion coefficient for each color in the EEPROM 265, which is different from the first exemplary embodiment.

The first distortion correction unit 261 corrects the first image signal D2R so that distortion for canceling distortion of a virtual image formed by the light-guiding optical device 130 of the first display module 101A is applied to a first image, and outputs the first image signal D2R that is corrected, as the first correction image signal D3R.

Similarly to the first distortion correction unit 261, the second distortion correction unit 262 corrects the second image signal D2L so that distortion for canceling distortion of a virtual image formed by the light-guiding optical device 130 of the second display module 101B is applied to a second image, and outputs the second image signal D2L that is corrected, as the second correction image signal D3L.

The first parallel movement unit 263 performs correction for each color by shifting a display position of an image corresponding to each color so that the red image PR is positioned upward with respect to the green image PG and the blue image PB is positioned downward with respect to the green image PG in the up-and-down direction of the image P displayed on the display element 11. The first parallel movement unit 263 further outputs the first correction image signal D3R that is corrected, as a first correction image signal D4R to the first panel driver 253.

Similarly to the first parallel movement unit 263, the second parallel movement unit 264 performs correction for each color by shifting a display position of an image corresponding to each color so that the red image PR is positioned upward with respect to the green image PG and the blue image PB is positioned downward with respect to the green image PG in the up-and-down direction of the image. The second parallel movement unit 264 further outputs the second correction image signal D3L that is corrected, as a second correction image signal D4L to the second panel driver 254.

Also in the present exemplary embodiment, correction of an axial chromatic aberration and correction of a chromatic aberration of magnification can be performed as appropriate, and a virtual image with high image quality and less color slurring can be obtained, while increase in size of the display module is avoided. Thus, such effects similar to those in the first exemplary embodiment can be obtained.

Further, the control unit 26 of the present exemplary embodiment can correct a chromatic aberration of magnification by parallel movement of a color image corresponding to each color light. Thus, it is only required to output the first correction image signals D3R and D3L to the first parallel movement unit 263 and the second parallel movement unit 264 after even distortion correction is performed for all the colors in each of the first distortion correction unit 261 and the second distortion correction unit 262. Thus, as compared to the control unit 25 of the first exemplary embodiment that performs distortion correction by using a different distortion coefficient for each color, the control unit 26 of the present exemplary embodiment can reduce a scale of a circuit constituting the control unit 26, and cost reduction can be achieved.

Note that the technical scope of the present disclosure is not limited to the above-described exemplary embodiments, and various modifications can be made to the above-described exemplary embodiments without departing from the spirit and gist of the present disclosure.

For example, in each of the above-described exemplary embodiments, description is given on a case in which one intermediate image is formed by the optical system of the display module. However, the number of intermediate images is not limited to one, and may be zero or two or more. In this case, when the number of intermediate images formed by the optical system is an odd number, correction may be performed so that an image formed on the display element is distorted in a direction opposite to a direction in which a projection image is distorted by the optical system. When the number of intermediate images is zero or an even number, correction may be performed so that an image formed on the display element is distorted in the same direction as a direction in which a projection image is distorted by the optical system.

Further, in each of the above-described exemplary embodiments, there is given an example in which the inner reflection surface of the prism is used as the second reflection surface that reflects the imaging light from the display element to the see-through mirror being the first reflection surface. However, a mirror may be used in place of the prism. Further, when the prism is used, for example, one lens may be arranged between the display element and the prism, the prism may function as the first optical member having relatively large power and a relatively large abbe number, and the lens may function as the second optical member having relatively small power and a relatively small abbe number.

Further, in each of the above-described exemplary embodiments, an example in which the light-guiding optical device includes the projection lens, the prism, and the see-through mirror is given. Alternatively, for example, optical members such as a reflection type volume hologram or a Fresnel lens may be included.

Other specific configurations such as the number, the arrangement, the shape, and the material of each of the various components constituting the display module and the display device are not limited to those in each of the above-described exemplary embodiments, and may be appropriately changed.

Further, in each of the above-described exemplary embodiments, the head-mounted display is given as one example of the display device. Alternatively, the present disclosure may be applied to, for example, a so-called hand-held display used by holding an apparatus main body with a hand and looking into the display like a pair of binocular glasses.

A display module according to one aspect of the present disclosure may have the following configurations.

A display module according to one aspect of the present disclosure includes a display element configured to emit imaging light including first color light and second color light different from the first color light, a light-guiding optical device configured to guide the imaging light emitted from the display element, and a control unit configured to perform distortion correction including correction of a chromatic aberration of magnification for an image displayed on the display element, wherein the light-guiding optical device is constituted of an optical system having non-axisymmetry in an up-and-down direction with respect to the imaging light entering the light-guiding optical device, the light-guiding optical device includes a first optical member having positive refractivity, a second optical member having positive refractivity, and a first reflection surface configured to reflect the imaging light toward a pupil position, the imaging light being emitted from the second optical member, the refractivity of the first optical member is greater than the refractivity of the second optical member, an abbe number of a constituent material of the first optical member is greater than an abbe number of a constituent material of the second optical member, and the control unit performs distortion correction by a different distortion correction amount for each of the first color light and the second color light.

In the display module according to one aspect of the present disclosure, a distortion correction amount at a first position in an up-and-down direction of an image displayed on the display element may be greater than a distortion correction amount at a second position lower than the first position.

A display module according to another aspect of the present disclosure includes a display element configured to emit imaging light including first color light and second color light different from the first color light, a light-guiding optical device configured to guide the imaging light emitted from the display element, and a control unit configured to perform distortion correction including correction of a chromatic aberration of magnification for an image displayed on the display element, wherein the light-guiding optical device is constituted of an optical system having non-axisymmetry in an up-and-down direction with respect to the imaging light entering the light-guiding optical device, the light-guiding optical device includes a first optical member having positive refractivity, a second optical member having positive refractivity, and a first reflection surface configured to reflect the imaging light toward a pupil position, the imaging light being emitted from the second optical member, the refractivity of the first optical member is greater than the refractivity of the second optical member, an abbe number of a constituent material of the first optical member is greater than an abbe number of a constituent material of the second optical member, and the control unit performs distortion correction by the same distortion amount for the first color light and the second color light, and displays images corresponding to the first color light and the second color light subjected to the distortion correction at display positions shifted according to color light.

In the display module according to another aspect of the present disclosure, the imaging light may contain red imaging light, green imaging light, and blue imaging light, and the control unit may shift, for respective colors, the display positions of the images corresponding to the first color light and the second color light so that, in an up-and-down direction of the image displayed on the display element, a red image formed by the red imaging light is positioned upward and a blue image formed by the green imaging light is positioned downward with respect to a green image formed by the green imaging light.

In the display module according to one aspect of the present disclosure, an intermediate image may be formed in an optical path of the imaging light in the light-guiding optical device, and the first optical member and the second optical member may be arranged between the display element and the intermediate image, of the intermediate image, formed by the imaging light emitted from a center pixel of the display element.

The display module according to one aspect of the present disclosure may further include a second reflection surface configured to reflect the imaging light, and the first optical member and the second optical member may be arranged between the display element and the second reflection surface.

In the display module according to one aspect of the present disclosure, the first optical element may be constituted of a prism including an inner reflection surface functioning as the second reflection surface, and the second optical element may be arranged between the display element and the prism.

In the display module according to one aspect of the present disclosure, the light-guiding optical device may be constituted of an optical system having axisymmetry in a right-and-left direction.

The display device according to one aspect of the present disclosure may have the following configurations.

A display device according to one aspect of the present disclosure includes the display module according to one aspect of the present disclosure.

What is claimed is:

1. A display module, comprising:
   a display element configured to emit imaging light including first color light and second color light different from the first color light;
   a light-guiding optical device configured to guide the imaging light emitted from the display element; and
   a processor configured to perform distortion correction including correction of a chromatic aberration of magnification for an image displayed on the display element, wherein
   the light-guiding optical device is constituted of an optical system having non-axisymmetry in an up-and-down direction with respect to the imaging light entering the light-guiding optical device, the light-guiding optical device includes
a first optical member having positive refractivity,
a second optical member having positive refractivity, and
a first reflection surface configured to reflect the imaging light toward a pupil position, the imaging light being emitted from the second optical member,
the refractivity of the first optical member is greater than the refractivity of the second optical member,
an abbe number of a constituent material of the first optical member is greater than an abbe number of a constituent material of the second optical member, and
the processor performs distortion correction by a different distortion correction amount for each of the first color light and the second color light.

2. The display module according to claim 1, wherein a distortion correction amount at a first position, in an up-and-down direction of an image displayed on the display element, is greater than a distortion correction amount at a second position lower than the first position.

3. The display module according to claim 1, wherein an intermediate image is formed in an optical path of the imaging light in the light-guiding optical device, and
the first optical member and the second optical member are arranged between the display element and an intermediate image, of the intermediate image, formed by the imaging light emitted from a center pixel of the display element.

4. The display module according to claim 1, further comprising
a second reflection surface configured to reflect the imaging light, wherein
the first optical member and the second optical member are arranged between the display element and the second reflection surface.

5. The display module according to claim 4, wherein the first optical member is constituted of a prism including an inner reflection surface functioning as the second reflection surface, and
the second optical member is arranged between the display element and the prism.

6. The display module according to claim 1, wherein the light-guiding optical device is constituted of an optical system having axisymmetry in a right-and-left direction.

7. A display device, comprising the display module according to claim 1.

8. A display module, comprising:
a display element configured to emit imaging light including first color light and second color light different from the first color light;
a light-guiding optical device configured to guide the imaging light emitted from the display element; and
a processor configured to perform distortion correction including correction of a chromatic aberration of magnification for an image displayed on the display element, wherein
the light-guiding optical device is constituted of an optical system having non-axisymmetry in an up-and-down direction with respect to the imaging light entering the light-guiding optical device,
the light-guiding optical device includes
a first optical member having positive refractivity,
a second optical member having positive refractivity, and
a first reflection surface configured to reflect the imaging light toward a pupil position, the imaging light being emitted from the second optical member,
the refractivity of the first optical member is greater than the refractivity of the second optical member,
an abbe number of a constituent material of the first optical member is greater than an abbe number of a constituent material of the second optical member, and
the processor performs distortion correction by a same distortion amount for the first color light and the second color light, and displays images corresponding to the first color light and the second color light subjected to the distortion correction at display positions shifted according to a first correction image signal and a second image correction signal output by the processor, respectively.

9. The display module according to claim 8, wherein the imaging light includes red imaging light, green imaging light, and blue imaging light, and
the processor shifts the display positions of the images corresponding to the first color light and the second color light so that, in an up-and-down direction of the image displayed on the display element, a red image formed by the red imaging light is positioned upward and a blue image formed by the blue imaging light is positioned downward with respect to a green image formed by the green imaging light.

* * * * *